United States Patent
Easton et al.

(10) Patent No.: US 6,985,516 B1
(45) Date of Patent: Jan. 10, 2006

(54) METHOD AND APPARATUS FOR PROCESSING A RECEIVED SIGNAL IN A COMMUNICATIONS SYSTEM

(75) Inventors: Kenneth D. Easton, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 09/723,795

(22) Filed: Nov. 27, 2000

(51) Int. Cl.
*H04B 1/69* (2006.01)
(52) U.S. Cl. ............... 375/150; 375/136; 375/137; 370/335; 370/441
(58) Field of Classification Search ............... 375/150, 375/130, 136, 140, 142, 147, 262, 137; 370/342, 370/335, 320, 441; 455/67.1
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,490,165 A | 2/1996 | Blakeney, II et al. | |
| 5,506,865 A | 4/1996 | Weaver, Jr. | |
| 5,530,716 A | 6/1996 | Lipa | |
| 5,561,618 A | 10/1996 | Dehesh | |
| 5,577,022 A | 11/1996 | Padovani et al. | |
| 5,644,591 A | 7/1997 | Sutton | |
| 5,654,979 A | 8/1997 | Levin et al. | |
| 5,710,784 A * | 1/1998 | Kindred et al. ............. | 375/262 |
| 5,764,687 A | 6/1998 | Easton | |
| 5,805,648 A | 9/1998 | Sutton | |
| 5,867,527 A | 2/1999 | Ziv et al. | |
| 5,903,550 A | 5/1999 | Spock | |
| 6,442,154 B1 * | 8/2002 | Bottomley ................. | 370/342 |
| 6,459,883 B2 * | 10/2002 | Subramanian et al. ..... | 455/67.1 |

FOREIGN PATENT DOCUMENTS

| | | |
|---|---|---|
| EP | 0998052 A2 * | 10/1999 |
| EP | 1017183 A2 * | 12/1999 |

\* cited by examiner

*Primary Examiner*—Shuwang Liu
(74) *Attorney, Agent, or Firm*—Philip Wadsworth; Sandra L. Godsey; Thomas R. Rouse

(57) ABSTRACT

A receiver unit includes a first buffer that receives and stores digitized samples at a particular sample rate and a data processor that retrieves segments of digitized samples from the first buffer and processes the retrieved segments with a particular set of parameter values. The data processor is operated based on a processing clock having a frequency that is (e.g., ten or more times) higher than the sample rate. Multiple instances of the received signal can be processed by retrieving and processing multiple segments of digitized samples from the first buffer. The receiver unit typically further includes a receiver that receives and processes a transmitted signal to provide the digitized samples and a controller that dispatches tasks for the data processor. The data processor can be designed to include a correlator, a symbol demodulation and combiner, a first accumulator, and a second buffer, or a combination thereof. The correlator despreads the retrieved segments of digitized samples with corresponding segments of PN despreading sequences to provide correlated samples, which are further processed by the symbol demodulation and combiner to provide processed symbols. The second buffer stores the processed symbols, and can be designed to provide de-interleaving of the processed symbols.

51 Claims, 17 Drawing Sheets

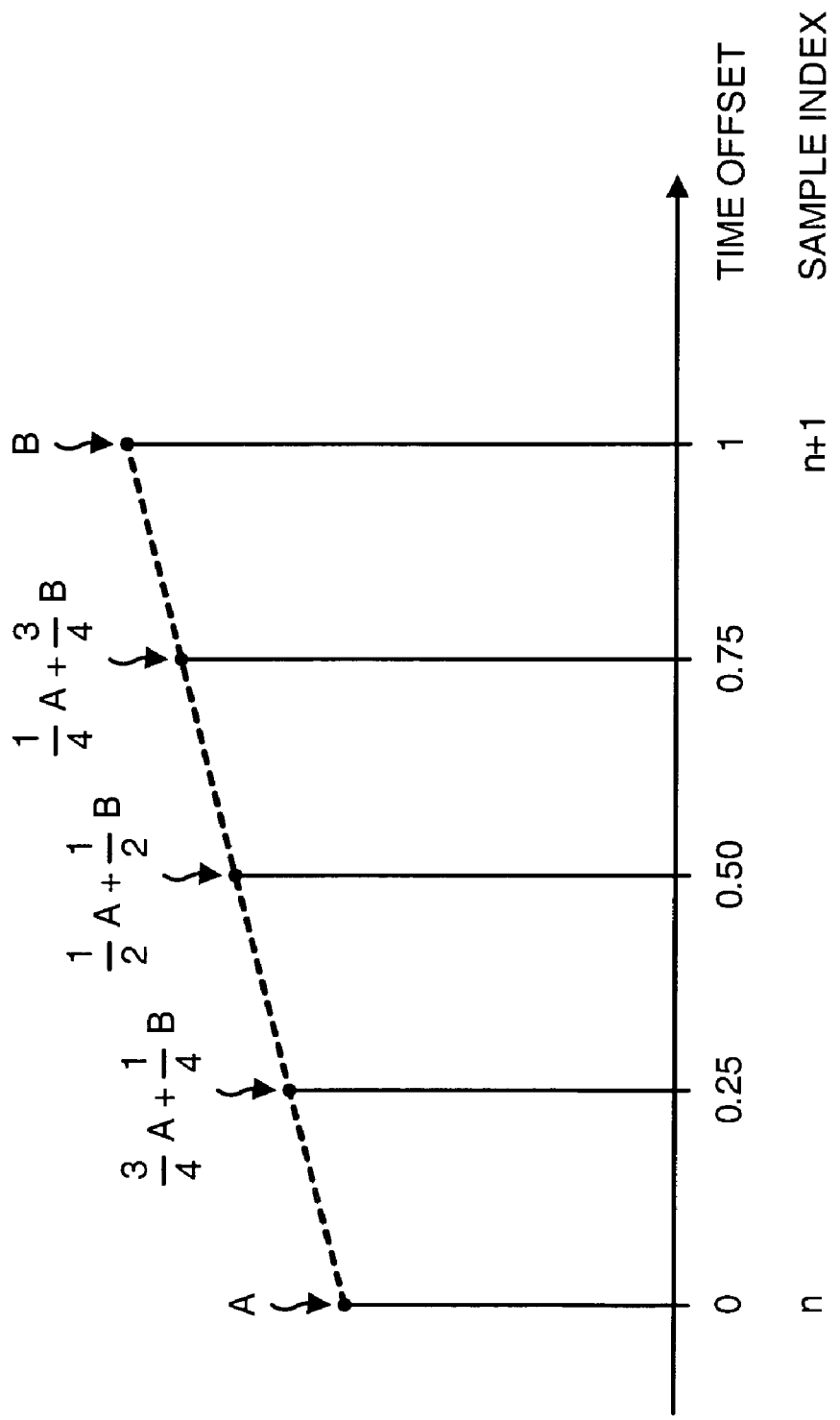

METHOD AND APPARATUS FOR PROCESSING A RECEIVED SIGNAL IN A COMMUNICATIONS SYSTEM

BACKGROUND OF THE INVENTION

I. Field of the Invention

The present invention relates to data communications. More particularly, the present invention relates to method and apparatus for efficiently processing a received signal in a communications system.

II. Description of the Related Art

In a typical digital communications system, data is processed at a transmitter unit, modulated, conditioned, and transmitted to a receiver unit. The data processing may include, for example, formatting the data into a particular frame format, encoding the formatted data to provide error detection/correction at the receiver unit, channelization (i.e., covering) of the encoded data, spreading the channelized data over the system bandwidth, and so on. The data processing is typically specifically defined by the system or standard being implemented.

At the receiver unit, the transmitted signal is received, conditioned, demodulated, and digitally processed to recover the transmitted data. The processing at the receiver unit is complementary to that performed at the transmitter unit and may include, for example, despreading the received samples, decovering the despread samples to generate decovered symbols, decoding the decovered symbols, and so on. Due to multipath and other phenomena, the transmitted signal may reach the receiver unit via multiple signal paths. For improved performance, the receiver unit is typically designed with the capability to process multiple (and strongest) instances of the received signal.

To perform the required signal processing, some conventional receiver units are designed with a number of processing elements, with each processing element being designed especially for, and dedicated to perform, a specific function. For example, a receiver unit may be designed with a searcher element and a number of data processing elements. The searcher element searches the received signal for strong signal instances, and the data processing elements are assigned to process specific signal instances of sufficient signal strength. Implementation of multiple parallel processing elements results in increased circuit complexity and costs. The processing elements are also typically of fixed designs, and no programmability is typically provided (e.g., to process the received signal with different sets of parameter values to perform, for example, pilot processing, signal searches, and data demodulation). Moreover, the number of signal instances that can be processed is limited to the number of processing elements implemented.

To reduce complexity, some other conventional receiver units are designed with a number of parallel front-end units coupled to a common datapath processor. Each front-end unit performs partial processing (e.g., despreading and decovering) of an assigned signal instance. The common datapath processor then performs the remaining processing (e.g., demodulation with the pilot, energy calculation, and so on) on the partially processed data. Again, a limited number of signal instances can be processed based on the number of front-end units implemented, and no programmability is typically provided.

For a user terminal, the ability to process many instances of a received signal can provide improved performance. For a base station, multiple signal instances for multiple users are typically required to be processed concurrently, thus further highlighting the need for efficient signal processing techniques. The ability to process signals for multiple users using a small number of signal processing elements is economically and technically desirable for various reasons such as, for example, higher board density, fewer component count, lower costs, and so on. Programmability in the signal processing elements is also desirable in communications systems that can transmit data using various parameter values (e.g., different channelization codes of various lengths) depending on various factors such as, for example, the data rate of the transmission.

As can be seen, techniques that can allow for efficient processing of a received signal in a communications system are highly desirable.

SUMMARY OF THE INVENTION

The invention provides an elegant demodulator design having numerous advantages over conventional designs. In accordance with certain aspects of the invention, a data processor is provided to perform many of the computationally intensive operations and a controller is provided to perform remaining tasks needed to process (e.g., demodulate) a received signal. This architecture allows the controller to manage the processing of many signal instances and to support many users concurrently. In certain designs, a micro-controller can be provided to perform the "micromanagement" of the data processor and to relieve the controller of some of the management duties associated with the low-level sequencing of the data processor. These various features allow for a simplified design having improved performance over conventional designs.

The data processor and controller can be designed to operate with processing clocks that may be asynchronous to, and are typically much faster than, the sample rate of the received samples. The faster processing clock allows for processing of more instances of the received signal with no additional increase in circuit complexity, and further allows the processing throughput to scale with the clock frequency. The data processor can also be designed to process data based on programmable parameter values, which provides increased flexibility and functionality. For example, the search time interval, the channelization (e.g., Walsh) codes, the time offset, and other parameters may be made programmable. The data processor can further be designed such that the processing elements can be shared to reduced circuit complexity and costs.

An embodiment of the invention provides a receiver unit for use in either a user terminal or a base station of a wireless communications system (e.g., a CDMA system). The receiver unit includes a first buffer coupled to a data processor. The first buffer receives and stores digitized samples at a particular sample rate (and may also store PN samples used for despreading the digitized samples). The data processor retrieves segments of digitized samples from the first buffer and processes the retrieved segments with a particular set of parameter values. The data processor is operated based on a processing clock having a frequency that is higher (e.g., ten or more times higher) than the chip rate. Multiple instances of the received signal can be processed by retrieving and processing multiple segments of digitized samples from the first buffer.

The receiver unit typically further includes a receiver and a controller. The receiver receives and processes a transmitted signal to provide the digitized samples. The controller dispatches tasks for the data processor and processes signaling information from the data processor.

The data processor can be designed to include a correlator, a symbol demodulation and combiner, a first accumulator, and a second buffer, or a combination thereof. The correlator despreads the retrieved segments of digitized samples with corresponding segments of PN despreading sequences to provide correlated samples. The symbol demodulation and combiner receives and further processes the correlated samples to provide processed symbols. The second buffer stores the processed symbols, and can be designed to provide de-interleaving of the processed symbols. In such design, the second buffer may be partitioned into two or more sections, with one section storing processed symbols for a current packet and another section storing processed symbols for a prior processed packet. The second buffer may also be designed to store fractions of packets. The symbols for the current packet can be processed while the symbols for the prior packet are provided to the subsequent signal processing element.

The correlator can be designed to include a despreader, a second (sample) accumulator, and an interpolator, or a combination thereof. The despreader includes a set of K multipliers that can concurrently despread sets of up to K complex digitized samples. The sample accumulator includes a set of K summers coupled to the set of K multipliers, with each summer receiving and summing samples from a respective set of multipliers. The interpolator receives and interpolates despread samples to generate interpolated samples.

The symbol demodulation and combiner can be designed to include a decover element, a pilot demodulator, and a third (symbol) accumulator, or a combination thereof. The decover element receives and decovers the correlated samples with one or more channelization codes to provide decovered symbols. The channelization codes may be Walsh codes having a length that is programmable and defined by the parameter values. The pilot demodulator demodulates the decovered symbols with pilot symbols to provide demodulated symbols. And the symbol accumulator accumulates the demodulated symbols from multiple signal instances to provide the processed symbols.

The decover element can be implemented with a fast Hadamard transform (FHT) element having L stages, and can be designed to receive and process inphase and quadrature correlated samples on alternating clock cycles. The FHT element can be designed to perform decovering with one or more Walsh symbols of a (programmable) length of 1, 2, 4, 8, 16, 32, 64, or 128, or some other length.

The first accumulator receives and processes the correlated samples to provide accumulated results. The first accumulator can be designed to accumulate the correlated samples over a programmable time interval to provide pilot signal estimates. The first accumulator may include a number of accumulate elements, with each accumulate element operated to provide pilot signal estimate for a particular time offset.

The sample rate can be asynchronous with the processing clock. In such case, the controller can be designed to implement a delay locked loop that tracks a chip rate of the digitized samples and provides a reset value, which is used to generate a signal that is then used to write packets of digitized samples to the first buffer starting at designated locations.

The controller can be designed to maintain a timing state machine for each signal instance being processed. Each timing state machine can be maintained using DSP (digital signal processor) firmware, and may include a time tracking loop used to (1) track movement of the signal instance being processed and (2) generate a time offset corresponding to the signal instance. The time offset can be used to retrieve the proper segment of samples from the first buffer to process. The controller can further receive a timing signal, which is used to initiate processing of the segments of samples. The timing signal can be generated based on a comparison value provided by the controller.

The receiver unit may further include a micro-controller that receives tasks dispatched by the controller and generates a set of control signals to direct the operation of the elements in the receiver unit. The micro-controller can instantiate a task state machine for each task being processed, and may include a sequencing controller that receives one or more indicator signals and the dispatched tasks and generates the set of control signals.

Another embodiment of the invention provides a method for processing a received signal in a wireless communications system. In accordance with the method, a transmitted signal is received, processed, and digitized to provide digitized samples at a particular sample rate. The digitized samples are then buffered in a first buffer, and segments of digitized samples are retrieved from the first buffer and processed with a particular set of parameter values, some of which may be programmable. The processing is performed based on a processing clock having a frequency that is higher than the sample rate.

The processing can include a combination of the following (1) despreading the retrieved segments of digitized samples with corresponding segments of PN despreading sequences to provide correlated samples, (2) decovering the correlated samples with one or more channelization codes to provide decovered symbols, (3) demodulating the decovered symbols with pilot symbols to provide demodulated symbols, and (4) accumulating the demodulated symbols from multiple signal instances to provide processed symbols.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 7C is a diagram that illustrates linear interpolation;

DETAILED DESCRIPTION OF THE SPECIFIC EMBODIMENTS

Figure 1:
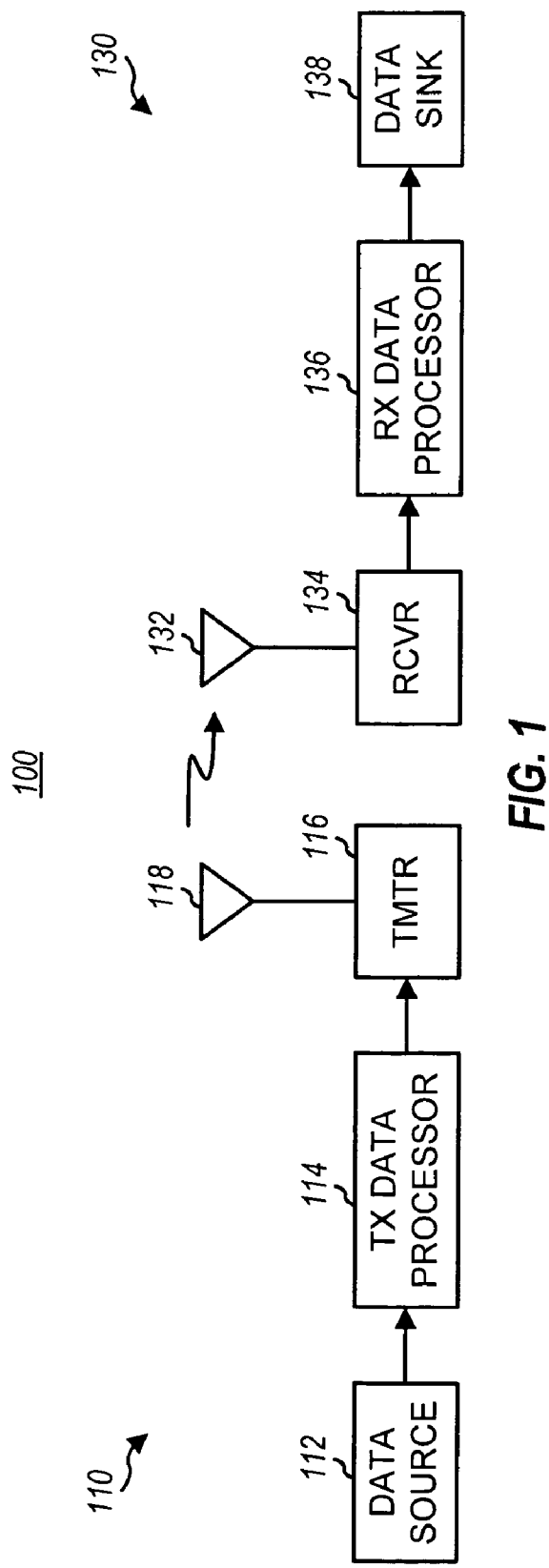
FIG. 1 is a simplified block diagram of a communications system.

FIG. 1 is a simplified block diagram of an embodiment of the signal processing for a data transmission in a communications system 100. At a transmitter unit 110, data is sent, typically in packets, from a data source 112 to a transmit (TX) data processor 114 that formats, encodes, and processes the data to generate baseband signals. The baseband signals are then provided to a transmitter (TMTR) 116, quadrature modulated, filtered, amplified, and upconverted to generate a modulated signal that is transmitted via an antenna 118 to one or more receiver units.

At a receiver unit 130, the transmitted signal is received by an antenna 132 and provided to a receiver (RCVR) 134. Within receiver 134, the received signal is amplified, filtered, downconverted, quadrature demodulated to baseband, and digitized to provide inphase (I) and quadrature (Q) samples. The samples are provided to a receive (RX) data processor 136 and decoded and processed to recover the transmitted data. The decoding and processing at receiver unit 130 are performed in a manner complementary to the encoding and processing performed at transmitter unit 110. The recovered data is then provided to a data sink 138.

The signal processing described above supports transmissions of packet data, messaging, voice, video, and other types of communication in one direction. A bi-directional communications system supports two-way data transmission. However, the signal processing for the other direction is not shown in FIG. 1 for simplicity.

Communications system 100 can be a code division multiple access (CDMA) system or other multiple access communications system that supports voice and data communication between users over a terrestrial link. The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." Another specific CDMA system is disclosed in U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003 to Padovani et al. These patents and patent application are assigned to the assignee of the present invention and incorporated herein by reference.

CDMA systems are typically designed to conform to one or more standards such as the "TIA/EIA/IS-95-A Mobile Station-Base Station Compatibility Standard for Dual-Mode Wideband Spread Spectrum Cellular System" (hereinafter referred to as the IS-95-A standard), the "TIA/EIA/IS-98 Recommended Minimum Standard for Dual-Mode Wideband Spread Spectrum Cellular Mobile Station" (hereinafter referred to as the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (hereinafter referred to as the W-CDMA standard), and the "TR-45.5 Physical Layer Standard for cdma2000 Spread Spectrum Systems" (hereinafter referred to as the CDMA-2000 standard). New CDMA standards are continually proposed and adopted for use. These CDMA standards are incorporated herein by reference.

Figure 2:
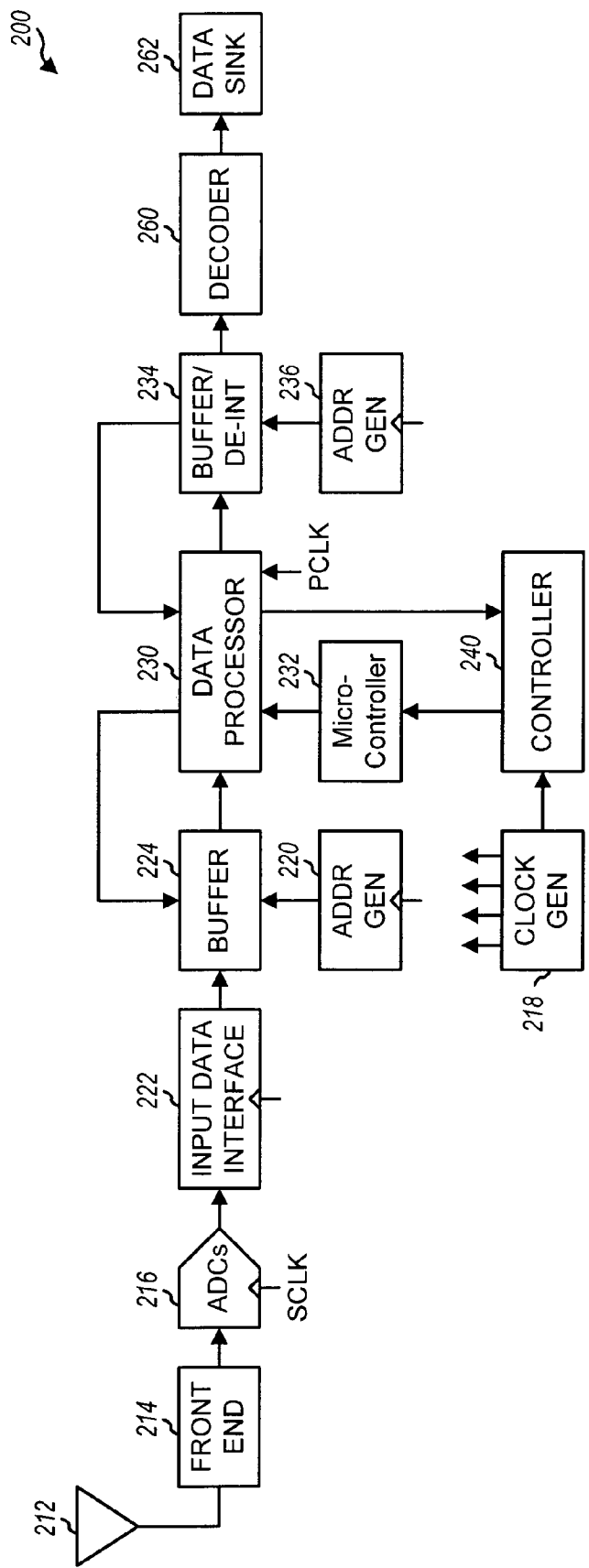
FIG. 2 is a block diagram of a specific embodiment of a receiver unit suitable for receiving and processing a modulated signal.

FIG. 2 is a block diagram of a specific embodiment of a receiver unit 200 suitable for receiving and processing a modulated signal. Receiver unit 200 is a specific embodiment of receiver unit 130 in FIG. 1. The modulated signal is received by an antenna 212 and provided to a front-end unit 214. Within front-end unit 214, the received signal is amplified, filtered, frequency downconverted, and quadrature demodulated to provide baseband signals. The baseband signals are then digitized by one or more analog-to-digital converters (ADCs) with a sampling clock SCLK to generate inphase ($I_{ADC}$) and quadrature ($Q_{ADC}$) samples that are provided to a data interface circuit 222. Front-end unit 214 and ADCs 216 may be implemented within receiver 134 in FIG. 1.

Depending on the particular design of receiver unit 200, ADCs 216 may provide $I_{ADC}$ and $Q_{ADC}$ samples at a high sample rate and corresponding to signals received from one or more antennas. Data interface circuit 222 may decimate (i.e., remove) unnecessary samples, arrange (i.e., sort) samples corresponding to each antenna, and assemble the samples into words suitable for efficient storage to a buffer 224. In a specific embodiment, each word comprises 32 bits of data, each $I_{ADC}$ or $Q_{ADC}$ sample comprises 4 bits of data, and four pairs of $I_{ADC}$ and $Q_{ADC}$ samples are arranged into each word. Other word widths (e.g., 16 bits, 64 bits, 128 bits, and so on) may also be used and are within the scope of the invention. When a word is available for storage, a data write address DW_ADDR is generated by an address generator 220, and the word is written to buffer 224 at the location identified by the generated data write address.

A data processor 230 then retrieves samples from buffer 224, processes the retrieved samples as directed by a controller 240, and provides processed symbols to a buffer/de-interleaver 234. Data processor 230 may subsequently retrieve symbols from buffer/de-interleaver 234 and accumulate symbols from multiple signal instances to provide accumulated symbols that are then provided back to buffer/de-interleaver 234. When a demodulated symbol is available for retrieval from buffer/de-interleaver 234, a symbol read address SR_ADDR is generated by an address generator 236 and used to provide the symbol to a decoder 260. Data processor 230 may also provide processed signaling data directly to controller 240. Decoder 260 decodes the demodulated symbols in accordance with a decoding scheme that is complementary to the encoding scheme used at the transmitter unit and provides decoded data to a data sink 262.

Data processor 230 typically includes a correlator, an accumulator, a symbol demodulator (multiplier) and combiner, or a combination thereof, depending on the particular design of the data processor. Data processor 230 performs many of the functions required to demodulate the received samples. Data processor 230 can be designed to provide demodulated symbols directly to decoder 260 for decoding and processed signaling data to controller 240 for further processing. Such processed signaling data may include, for example, accumulations of the pilot reference and data rate control (DRC) symbols for the reverse link processing, and power control symbols for the forward link processing.

Controller 240 can be designed to perform various functions such as, for example, the pilot filtering, finger lock detection, time tracking for each signal instance being processed, finger time offset maintenance, frequency tracking (for a forward link processing by a remote terminal), or a combination thereof. Controller 240 further directs the operation of data processor 230 and buffer/de-interleaver 234 to achieve the desired functions.

In some designs, a micro-controller 232 is provided to direct the operation of data processor 230. In such designs, micro-controller 232 receives directives or commands from controller 240 to perform particular tasks (e.g., perform correlation for one or all assigned fingers). Micro-controller 232 then directs operation of data processor 230 and other units (e.g., buffer 224, buffer/de-interleaver 234) to execute the tasks. Micro-controller 232 can reduce the amount of supervision required by controller 240 and the interaction between controller 240 and other elements. Micro-controller 232 can thus free up controller 240 and allow it to support additional channels/users.

For the design shown in FIG. 2, the number of users that can be supported generally scales with the frequencies of the clock signals provided to data processor 230 and controller 240. These two clocks are independent and, depending on their particular frequencies, one of the clocks typically limits the number of signal instances/users that can be supported.

A clock generator 218 generates the sampling clock SCLK for ADCs 216 and other clocks for other elements within receiver unit 200. In an embodiment, clock generator 218 includes a free-running clock source that generates a master clock signal and one or more real-time clock counters (and/or phase locked loop) that generate other clock signals used by the elements within receiver unit 200. The free-running clock source can be implemented with a voltage controlled crystal oscillator or some other type of oscillator. The real-time clock counters are triggered by the master clock signal and generate clock signals having lower frequencies but synchronous to the master clock signal. Such clock signals include the ADC sampling clock SCLK, the data processor clock PCLK, the clocks for address generators 220 and 236, and so on. In a specific embodiment, the sample clock SCLK is derived from the master clock signal and has a frequency that is closely related to (but not necessarily phased locked to) the chip rate of the received signal.

In an embodiment, address generator 220 includes a data write address generator that generates the data write address DW_ADDRESS and a data read address generator that generates a data read address DR_ADDR. Address generator 220 may further include address generators for other data (PN sequences) that may also be stored in buffer 224. In an embodiment, address generator 236 includes a symbol write address generator that generates the symbol write address SW_ADDRESS and a symbol read address generator that generates the symbol read address SR_ADDR. Address generators 220 and 236 are described in further detail below.

The implementation and operation of the elements of receiver 200 are described in further detail below.

In accordance with the invention, data processor 230 and controller 240 are designed with a set of features that provides improved performance and efficiency over conventional data processing units. Some of these features are described briefly below.

First, data processor 230 performs many of the computationally intensive operations and thus allows controller 240 to support many users concurrently. Data processor 230 can be designed to perform the required processing on the received data and to provide demodulated symbols directly to decoder 260. Controller 240 can thus be relieved of the intensive data processing (e.g., dot product computation), which typically equates to the need for a more complicated controller in conventional designs and traditionally prevents the controller from concurrently supporting a number of users or processing a number of signal instances. Moreover, micro-controller 232 can be provided to perform the "micro-management" of data processor 230 and to relieve controller 240 of some of the mundane management duties.

Second, data processor 230 and controller 240 can each be operated with a clock signal that may be asynchronous to, and is typically much faster than, the sample rate of the samples stored in buffer 224. For example, the sample rate may be selected to be twice the chip rate of the received signal (i.e., $f_{sam} \approx 2.4$ Msps) and the clock signal PCLK may be selected to be more than an order of magnitude faster than the sample rate (e.g., $F_{PCLK} > 50$ MHz). If data processor 230 and controller 240 are used at a user terminal, the faster clock signals allow for processing of more instances of the received signal. In this case, data processor 230 and controller 240 can be used to instantiate and support more fingers of a rake receiver with no additional increase in circuit complexity. And if data processor 230 and controller 240 are used at a base station, the faster clock signals allow for processing of the received signals from a greater number of users and/or more instances of the received signals.

Third, data processor 230 and controller 240 can each be designed to process data based on programmable parameter values. For example, the number of samples to be accumulated during a search operation may be selected by controller 240 and provided to data processor 230. As another example, data processor 230 may be configured to decover the samples with one or more channelization codes of programmable length. In contrast, conventional receiver designs typically include dedicated hardware elements that perform a specific set of tasks with little or no programmability. The programmability feature of the invention can allow for improved performance over conventional designs.

Fourth, data processor 230 and controller 240 can be designed such that the processing can be shared for reduced circuit complexity and costs. Each of data processor 230 and controller 240 typically includes a set of processing elements that performs various required functions (e.g., despreading, decovering, accumulation, and pilot demodulation for data processor 230, and pilot recovery and time tracking for controller 240). To perform a particular task on a segment of samples, only the processing elements required for that task are enabled and the remaining elements can be disabled or bypassed. The processing elements within each of data processor 230 and controller 240 are typically not duplicated, except in instances where parallel processing is desired to further improve performance. In contrast, conventional receiver designs typically include duplication of many functions, which can lead to increased circuit complexity and costs.

Data processor 230 can be designed to process a data transmission in accordance with various CDMA standards and systems. For clarity, the invention is now described for the specific CDMA system described in the aforementioned U.S. patent application Ser. No. 08/963,386, hereinafter referred to as the high data rate (HDR) CDMA system.

Figure 3:
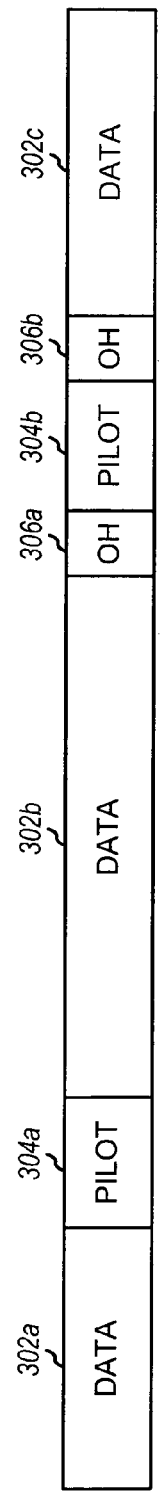
FIG. 3 is a diagram of a data frame format for a forward link transmission in accordance with a high data rate (HDR) CDMA system.

FIG. 3 is a diagram of a data frame format for the forward link transmission in accordance with the HDR CDMA system. On the forward link, traffic data, pilot reference, and signaling data are time division multiplexed in a frame and transmitted from a base station to a particular user terminal. Each frame covers a time unit referred to as a slot (e.g., 1.67 for a particular design of the HDR system). Each slot includes traffic data fields 302a, 302b, and 302c, pilot reference fields 304a and 304b, and signaling data i.e., overhead (OH) fields 306a and 306b. Traffic data fields 302 and pilot reference fields 304 are used to send traffic data and pilot reference, respectively. Signaling data fields 306 are used to send signaling information such as, for example, forward link activity (FAC) indicators, reverse link busy indicators, reverse link power control commands, and so on. The FAC indicators indicate whether the base station has traffic data to send a particular number of slots in the future. The reverse link busy indicators indicate whether the reverse link capacity limit of the base station has been reached. And the power control commands direct transmitting user terminals to increase or decrease their transmit power.

In accordance with the HDR CDMA system, prior to transmission, the traffic data is covered with Walsh codes corresponding to the channels used for the data transmission, and the power control data for each user terminal is covered with the Walsh code assigned to the user terminal. The pilot reference, covered traffic, and power control data are then spread with a complex PN spreading sequence generated by multiplying the short PN spreading sequences assigned to the particular transmitting base station with the long PN sequence assigned to the user terminal.

Figure 4:
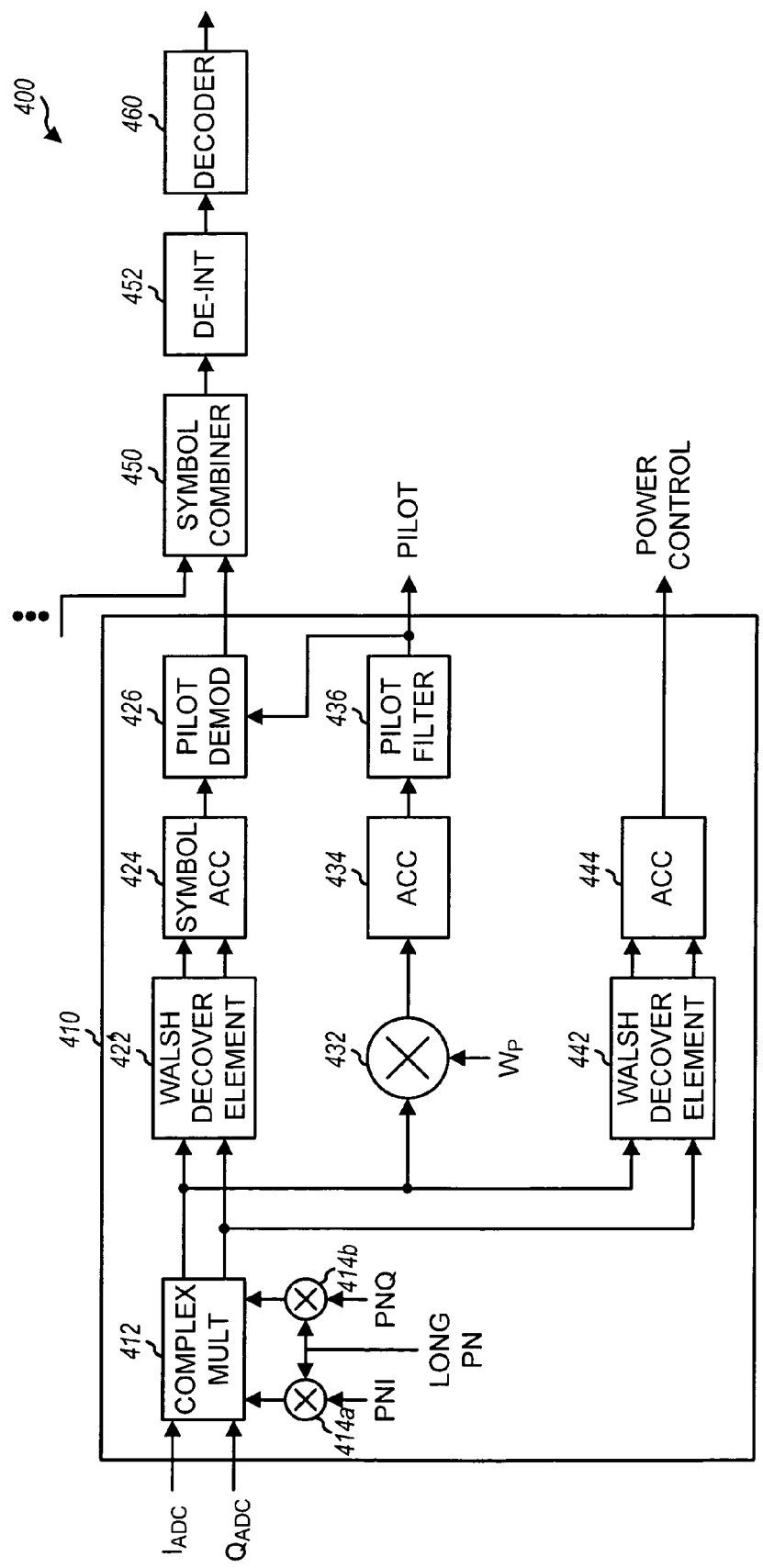
FIG. 4 is a block diagram of an embodiment of a receive data processor that can be used to process a forward link data transmission in the HDR CDMA system.

FIG. 4 is a block diagram of an embodiment of a receive data processor 400 that can be used to process a forward link data transmission in the HDR CDMA system. The digitized $I_{ADC}$ and $Q_{ADC}$ samples from the receiver are provided to a number of data correlators 410 (only one is shown in FIG. 4 for simplicity). Due to multipath and other phenomena, a transmitted signal may reach a receiver unit via multiple signal paths. For improved performance, the receiver unit is typically designed with the capability to process multiple (and strongest) instances of the received signal. For a conventional design, a number of data correlators 410 are provided, with each data correlator 410 commonly referred to as a finger of a rake receiver. Each data correlator 410 can be assigned to process a particular instance of the received signal.

Within data correlator 410, the $I_{ADC}$ and $Q_{ADC}$ samples are provided to a complex multiplier 412 that also receives a complex PN despreading sequence from multipliers 414a and 414b. The complex PN despreading sequence is generated by multiplying the short PNI and PNQ sequences corresponding to the base station from which the signal is received with the long PN sequence assigned to receiver unit 400. The PN sequences have time offsets corresponding to the particular signal instance being processed by data correlator 410.

Multiplier 412 performs a complex multiply of the complex $I_{ADC}$ and $Q_{ADC}$ samples with the complex PN despreading sequence and provides complex despread $I_{DES}$ and $Q_{DES}$ samples to Walsh decover elements 422 and 442. The despread $I_{DES}$ samples are also provided to a Walsh decover element 432.

Walsh decover element 422 decovers the despread $I_{DES}$ and $Q_{DES}$ samples with the Walsh codes used to cover the data at the base station and generates a number of streams of decovered samples, one stream for each channel used for the data transmission. The sample streams are then provided to a symbol accumulator 424 that accumulates samples in each stream based on the data rate of the channel used for transmitting the stream. For each stream, symbol accumulator 424 accumulates a number of decovered samples to generate a decovered symbol. The decovered symbols are then provided to a pilot demodulator 426.

Walsh decover element 432 decovers the despread $I_{DES}$ samples with the particular Walsh code $W_p$ (e.g., Walsh code 0) used to cover the pilot reference at the base station. The decovered pilot samples are then provided to an accumulator 434 and accumulated over a particular time interval (e.g., the duration of a pilot reference, or pilot reference period) to generate a pilot symbol. The pilot symbols are then provided to a pilot filter 436 and used to generate a recovered pilot signal. The recovered pilot signal comprises estimated or predicted pilot symbols for the time durations between pilot references and is provided to pilot demodulator 426.

Pilot demodulator 426 performs coherent demodulation of the decovered data symbols from symbol accumulator 424 with the pilot symbols from pilot filter 436 and provides demodulated data symbols to a symbol combiner 450. Coherent demodulation is achieved by performing a dot product and a cross product of the decovered data symbols with the pilot symbols, as described below. The dot and cross products effectively perform a phase demodulation of the data and further scale the resultant output by the relative strength of the recovered pilot. The scaling with the pilots effectively weighs the contributions from different instances of the received signal in accordance with the quality of the received signal instances for efficient combining. The dot and cross products thus perform the dual role of phase projection and signal weighting that are characteristics of a coherent rake receiver.

Symbol combiner 450 receives the demodulated data symbols from each assigned data correlator 410, coherently combines the symbols, and provides recovered data symbols to a de-interleaver 452. De-interleaver 452 reorders the symbols in a manner complementary to that performed at the base station. The data symbols from de-interleaver 452 is then decoded by a decoder 460 and provided to a data sink.

The design and operation of a rake receiver for a CDMA system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS." Pilot carrier dot product and the (optimal) weighting of the rake receiver finger paths are described in further detail in U.S. Pat. No. 5,506,865, entitled "PILOT CARRIER DOT PRODUCT CIRCUIT." The patents are assigned to the assignee of the present invention and incorporated herein by reference.

In the HDR CDMA system, power control data for a particular user terminal is covered with a particular Walsh code assigned to the terminal and transmitted in each slot.

Thus, within data correlator 410, the despread $I_{DES}$ and $Q_{DES}$ samples are decovered by Walsh decover element 442 with the assigned Walsh code. The decovered power control samples are then provided to an accumulator 444 and accumulated over the duration of a power control burst to generate a power control bit for the signal instance being processed. The power control bits from all assigned data correlators 410 may be coherently combined (not shown in FIG. 4 for simplicity) to generate a combined power control bit that is then used to adjust the transmit power of the user terminal.

Figure 5:
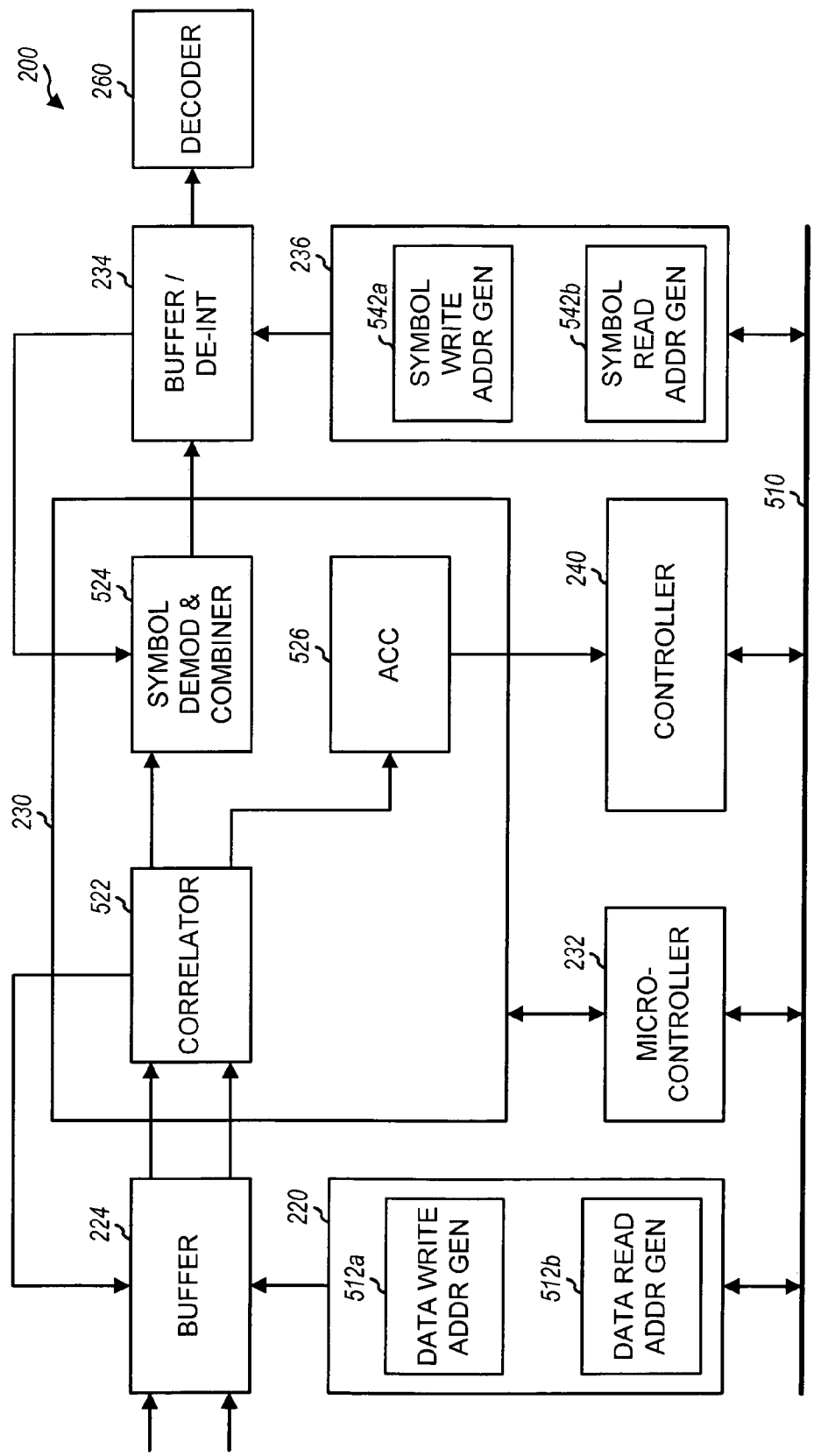
FIG. 5 is a block diagram of a specific embodiment of a data processor of the invention.

FIG. 5 is a block diagram of a specific embodiment of data processor 230, which is capable of processing data transmissions on the forward and reverse links for various CDMA systems. For example, data processor 230 can be configured to perform the signal processing utilizing a pilot reference for coherent demodulation for a forward link data transmission in the HDR CDMA system, as described above in FIG. 4.

Referring back to FIG. 2, the $I_{ADC}$ and $Q_{ADC}$ samples from ADCs 216 are formatted by input data interface 222 and stored to buffer 224. In an embodiment, buffer 224 is implemented as a circular, two-dimensional buffer having a size that is selected based on a number of factors such as, for example, the input sample rate, the resolution of the input samples, the output sample rate, and so on. Buffer 224 is designed with the capability to store data samples received over a particular time period (e.g., two frames of samples, or some other period). The time period is selected to be large enough to allow for the collection of a sufficient amount of data for all signal paths to be processed, but short enough to prevent the writing of new samples over old, unprocessed samples. The time period over which samples are collected and stored may be programmable.

In an embodiment, for ease of writing data into buffer 224, each row of the buffer has a width that is matched to the width of the output word of input data interface 222 (e.g., 32 bits). As a word becomes available for writing to buffer 224, a data write address generator 512a generates a data write address DW_ADDR corresponding to the next available row in buffer 224. The word is then written to buffer 224 in the row indicated by the generated address. Thereafter, the stored samples are available for retrieval and processing by data processor 230.

Data processor 230 can be directed to process the data samples in accordance with a particular set of parameter values. For traffic data processing, data processor 230 may be directed to: (1) despread and decover a particular instance of the received signal at a particular time offset, (2) perform pilot demodulation of the decovered symbols, and (3) coherently combine demodulated symbols corresponding to different signal instances, and so on. For signaling (e.g., pilot and power control) data processing, data processor 230 may be directed to: (1) despread and/or decover a particular instance of the received signal, (2) accumulate the decovered samples over a particular time interval, (3) combine accumulated symbols from various signal instances, and so on. Data processor 230 may also be operated to search for strong instances of the received signal. Data processor 230 can be designed and operated to perform various signal processing, depending on the particular CDMA standard or system and the particular (forward or reverse link) data transmission being supported.

Buffer/de-interleaver 234 provides storage for the processed symbols from data processor 230. As a symbol is processed by data processor 230 and becomes available for writing to buffer/de-interleaver 234, a symbol write address generator 542a generates a symbol write address SW_ADDR corresponding to the proper location in buffer/de-interleaver 234. The processed symbol is then written to buffer/de-interleaver 234 to the location indicated by the generated symbol write address. Thereafter, the stored symbols may be provided back to data processor 230 for further processing (e.g., accumulation with the processed symbols for another signal instance). Buffer/de-interleaver 234 thus stores the results of the pilot demodulation for the first signal instance, and further stores the results of the accumulation of the pilot demodulation for subsequent signal instances.

By generating the proper symbol read and write addresses, buffer/de-interleaver 234 can be operated to reorder the symbols in accordance with a particular de-interleaving scheme. When symbols are ready to be provided to decoder 260, controller 240 initiates the read process at the appropriate time. Symbol address generator 542b then generates the proper read addresses to achieve the desired symbol de-interleaving. The de-interleaved (i.e., demodulated) symbols are provided to decoder 260 for decoding.

In the embodiment shown in FIG. 5, the I and Q samples from buffer 224 are provided to a correlator 522 within data processor 230. Correlator 522 further receives the complex PN despreading sequence, which may also be stored in buffer 224 or generated by a PN generator (not shown in FIG. 5). For traffic data processing, correlator 522 despreads the I and Q samples with the complex PN despreading sequence to provide despread samples. Correlator 522 thus performs the despreading function performed by complex multiplier 412 in FIG. 4. Correlator 522 may also be designed to perform other functions such as, for example, accumulation of multiple despread samples for each chip interval, interpolation of the despread samples, and so on. The despread samples are provided to a symbol demodulator and combiner 524.

Symbol demodulator and combiner 524 can be configured to perform decovering, coherent demodulation with the pilot, symbol combining for multiple signal instances, symbol accumulation for repeated symbols in a packet, or a combination thereof. For decovering, symbol demodulator and combiner 524 receives the despread samples from correlator 522 and performs decovering with a set of Walsh symbols. In an embodiment, the length of the Walsh symbols is programmable and can be selected as 1, 2, 4, 8, 16, or some other length (e.g., 32, 64, 128, and so on).

For coherent demodulation, symbol demodulator and combiner 524 receives and coherently demodulates the decovered data symbols with the recovered pilot symbols to generate demodulated symbols that are stored to buffer/de-interleaver 234. For symbol combining, symbol demodulator and combiner 524 receives and combines demodulated symbols corresponding to various signal instances to generate recovered symbols that are stored back to buffer/de-interleaver 234. Symbol demodulator and combiner 524 can thus perform the functions performed by data correlator 410 and symbol combiner 450 in FIG. 4.

Buffer/de-interleaver 234 stores the intermediate and final results of the symbol accumulation. The processed symbols from symbol demodulator and combiner 524 are written to buffer/de-interleaver 234 at locations identified by a symbol write address generator 542a within address generator 236. Stored symbols are retrieved from buffer/de-interleaver 234 from locations identified by a symbol read address generator 542b. Buffer/de-interleaver 234 can be operated to perform symbol de-interleaving in a manner complementary to that performed at the transmitter unit by generating the proper symbol read addresses. The retrieved symbols from buffer/de-interleaver 234 comprise the demodulated symbols that are provided to decoder 260.

For signaling data processing, correlator 522 can be configured to despread the I and Q samples with the complex PN despreading sequence and provide the despread samples to an accumulator 526. Accumulator 526 may be configured to decover the despread samples with one or more Walsh codes, accumulate the despread or decovered samples over a particular time period (e.g., a pilot reference period), and provide the recovered (e.g., pilot or power control) data to controller 240. Accumulator 526 may also be configured to provide processed samples used to search for strong instances of the received signal at various time offsets, as described below.

In an embodiment, controller 240 processes the pilot symbols from accumulator 526 and generates the recovered pilot that is used for coherent demodulation of the data symbols. In other embodiments, a pilot processor can be implemented within data processor 230 to filter the pilot symbols and generate the recovered pilot. Other designs to process the pilot reference can also be contemplated and are within scope of the invention.

In the embodiment shown in FIG. 5, a data bus 510 interconnects various elements of receiver unit 200, such as address generator 220, data processor 230, micro-controller 232, and controller 240. Data bus 510 supports efficient transfer of data and other information between the elements coupled to the data bus. For example, data bus 510 can be used by controller 240 to dispatch tasks to micro-controller 232 and to send processed pilot symbols to data processor 230. Other mechanisms to interconnect the elements of receiver unit 200 can also be contemplated and are within the scope of the invention.

Figure 6A:
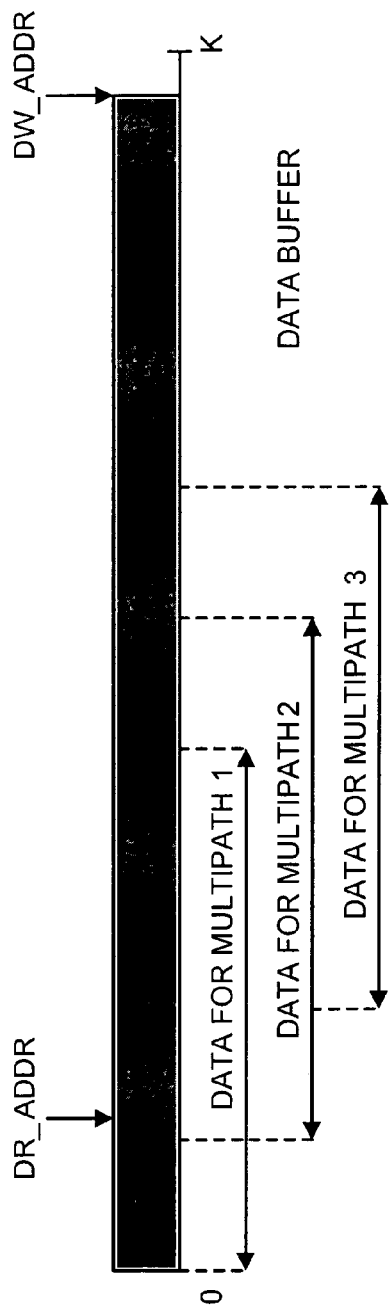
FIGS. 6A and 6B are diagrams illustrating the writing and reading of data samples to and from a buffer, and the writing and reading of PN samples to and from the buffer, respectively.

FIG. 6A is a diagram illustrating the writing and reading of data samples to and from buffer 224. In a typical digital communications system, data is partitioned and processed in packets that are then transmitted in frames of a particular time duration. For example, in the HDR CDMA system, data is transmitted in packets, with each packet being transmitted over one or more slots. Each slot is a fraction of a frame and (in the HDR system) includes 2048 chips, with each chip having a period $T_C$ that is related to the overall system bandwidth (i.e., $T_C=1/BW$).

In an embodiment, the received samples are written to buffer 224 starting at a designated address, which may be arbitrarily selected (e.g., an address of zero, as shown in FIG. 6A). In an embodiment, a data write address pointer is initialized to the designated address upon the occurrence of a reset event (e.g., power up) and samples are written to buffer 224 starting at the location identified by the pointer. An arbitrary offset or phase shift thus exists between the write address pointer and the actual boundary of the over-the-air frame represented by the samples. The frame boundary can correspond to any address in buffer 224. During the process of acquisition, this offset is calculated by controller 240. Subsequent data retrievals are compensated by the computed offset, by adding the offset to the read address pointer.

The data write address generator generates the data write address DW_ADDR that points to the next available location in buffer 224. In an embodiment, samples are written to buffer 224 is sequential locations and the data write address DW_ADDR is incremented after each write operation. In an embodiment, buffer 224 is implemented as a circular buffer that wraps around. By selecting the size of buffer 224 to be a power of 2, a binary counter can be used to provide the required write (or read) address. This counter naturally wraps around and resets to zero when the end of buffer 224 is encountered.

After a sufficient number of samples have been stored to buffer 224, a particular segment of samples can be retrieved from the buffer and processed. The segment can include data samples for an entire packet or a portion of a packet. In a specific embodiment, each segment of data samples corresponds to a separate pilot reference, and the size of the segment is limited by the duration of time in which the channel is coherent over the pilot reference. In an embodiment, as part of the pilot processing within controller 240, a pilot vector corresponding to the pilot reference is phase rotated according to a frequency error estimate to generate pilot estimates that are then provided to data processor 230 for the pilot demodulation. Controller 240 thus samples the pilot reference at the beginning of a segment and uses this pilot reference to generate pilot estimates for the duration of the segment. The phase error in the pilot estimates accumulates across the length of the segment, and thus the segment length is limited to reduce the amount of accumulated phase error in the pilot estimates. This design avoids a need for a dedicated complex chip rate multiplier to rotate the samples themselves, which can increase the complexity of the data processor.

Segments of data samples corresponding to different signal instances (or multipaths) can be sequentially processed. For example, samples corresponding to the first multipath having a time offset of zero may be retrieved from buffer 224 and processed by data processor 230. Upon completion of the processing for the first multipath, another segment of samples (e.g., corresponding to the second multipath) can be retrieved from buffer 224 and processed. For each segment to be processed, the data read address generator is loaded with an initial address that takes into account (1) the arbitrary offset between zero offset alignment of the samples and the write address pointer, (2) the address of the segment relative to the start of the packet, and (3) the time offset associated with the particular multipath being processed.

Figure 6B:
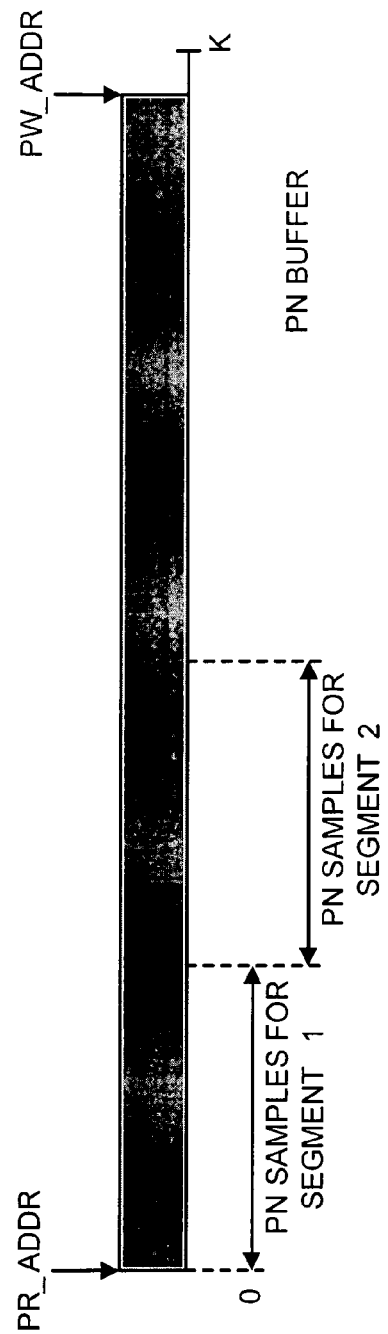

FIG. 6B is a diagram illustrating the writing and reading of PN samples to and from buffer 224. In a specific embodiment, the complex PN samples used for despreading the received samples are computed by a PN generator and stored to a portion of buffer 224. Again, the PN samples can be stored starting at the designated address. Thereafter, a segment of PN samples can be retrieved from buffer 224 and used to despread a corresponding segment of data samples.

A PN write address generator is used to generate the PN write address PW_ADDR that points to the next available location in buffer 224, and a PN read address generator is used to generate the PN read address PR_ADDR for reading a segment of PN samples. For each data segment to be processed that requires PN samples, the PN read address generator is loaded with the address of the first PN sample in the segment. The PN write and read address generators are each appropriately incremented after each PN write or read operation.

The number of PN samples to store in buffer 224 can be based on a number of factors and can be matched to the number of data samples being stored. For example, two slots of PN samples can be stored for two slots of data samples. The number of PN samples to store may also be dependent on, for example, the size of buffer 224, the amount of multipath deskew to be supported, and so on.

Figure 6C:
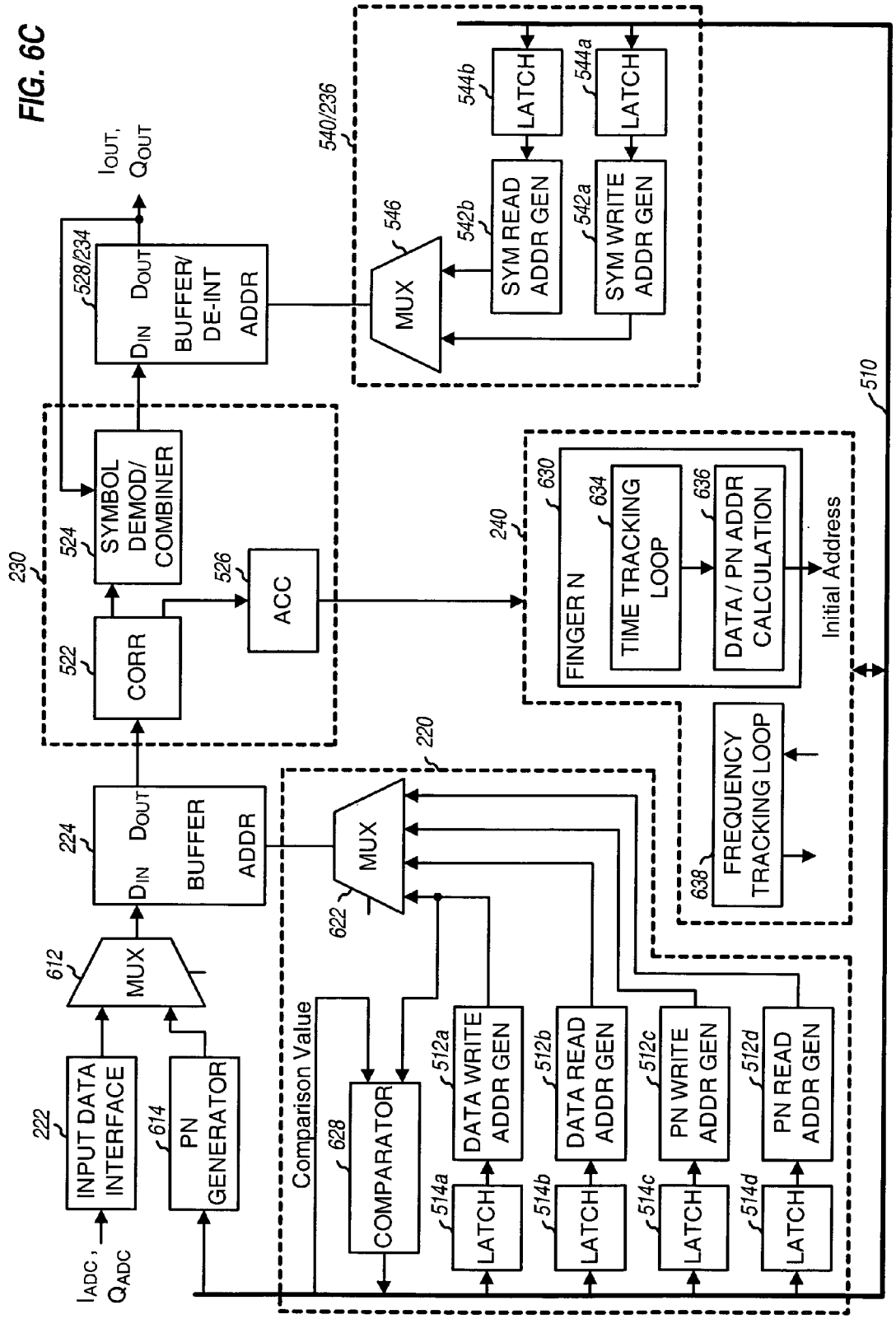
FIG. 6C is a block diagram of a specific embodiment of the data buffering for the receiver design shown in FIGS. 2 and 5.

FIG. 6C is a block diagram of a specific embodiment of the data buffering for the receiver design shown in FIGS. 2 and 5. The $I_{ADC}$ and $Q_{ADC}$ samples from the ADCs are provided to input data interface 222, which removes redundant samples, packs the samples into words, and provides the words to a multiplexer 612. A PN generator 614 receives a PN mask from data bus 510, generates a portion of each of the IPN and QPN sequences to be used for despreading the data samples, and provides the generated IPN and QPN samples (in words) to multiplexer 612. Multiplexer 612 provides each received word, comprised of either data samples or PN samples, to buffer 224 at the location indicated by the write address provided by address generator 220.

FIG. 6C also shows a block diagram of a specific embodiment of address generator 220 used to generate the addresses for buffer 224. Address generator 220 includes data write address generator 512a, data read address generator 512b, a PN write address generator 512c, and a PN read address generator 512d coupled to latches 514a, 514b, 514c, and 514d, respectively. Address generators 512a through 512d further couple to a multiplexer 622, which selects the generated address from one of the address generators 512 and provides the selected address to buffer 224.

Each latch 514 stores a value indicative of the first address to be generated by address generator 512 for the segment to be processed. For example, to read a particular segment of data samples from buffer 224, the address of the first data sample in the segment is provided to latch 514b at the appropriate time. Data read address generator 512b loads the value stored in latch 514b and uses this value as the starting address. Subsequent data read addresses can be generated, for example, by incrementing a counter within data read address generator 512b.

As described above, the data samples can be stored to buffer 224 starting at an arbitrarily designated buffer location (e.g., zero). Also, buffer 224 is designed with the capacity to hold a particular number of samples. In an embodiment, buffer 224 has a size that is a power of two. A binary counter can then be used to generate the write (or read) address for buffer 224. The binary counter naturally wraps around to zero when the end of the buffer is reached.

In an embodiment, since data samples are written to buffer 224 in sequential order, data write address generator 512a can also be used as the sample counter that counts the number of samples stored to buffer 224. The data write address from address generator 512a is provided to a comparator 628 and compared against a comparison value provided by controller 240. The comparison value is indicative of the storage of a particular number of samples (e.g., one packet) that controller 240 would like to be notified. If the data write address equals the comparison value, comparator 628 provides a timing signal indicative of this condition. This timing signal is used by controller 240 to initiate the processing of the stored samples.

FIG. 6C also shows a specific embodiment of the time processing for each assigned multipath. In an embodiment, controller 240 maintains a timing state machine 630 for each multipath (i.e., finger) being processed. Although shown symbolically as a block in FIG. 6C, each timing state machine 630 is typically implemented and maintained by DSP firmware. Data processor 230 can be directed to perform some of the signal processing to search through the data samples for the strongest instances of the received signal (e.g., correlating a segment of PN samples with a number of segments of data samples at various time offsets). Each correlation peak corresponds to a strong signal instance. If the correlation peak exceeds a particular threshold, controller 240 instantiates a new timing state machine 630 for the multipath corresponding to the correlation peak. The time offset corresponding to the assigned multipath is then determined and used to generate the address for reading samples from buffer 224.

In an embodiment, each state machine 630 includes a time tracking loop 634 that tracks the movement of the multipath. The time tracking can be achieved by processing samples (e.g., corresponding to the pilot reference) at +½ and −½ chip offsets, determining the difference in the pilot accumulations at the +½ and −½ chip offsets, and filtering the difference value to generate a correction factor. Thus, as the multipath moves over time, time tracking loop 634 determines the amount of movement and updates the time offset with the correction factor accordingly. The time offset is provided to a data/PN address calculation unit 636 and used to compute the starting address of each data segment to be processed. The computed starting address is then provided to latch 514b via data bus 510 at the appropriate time.

As noted above, the samples are stored to buffer 224 starting at a designated location in memory at an arbitrary point in time. As a result, the starting samples for each signal instance being processed can correspond to any location in buffer 224. In an embodiment, the time tracking loop 634 is used to determine the starting location of the received data packet for each signal instance being processed. The time tracking loop 634 processes the received samples to determine a particular time offset for the received signal instance. This time offset is then used to generate the starting address for each segment of samples to be processed.

State machines 630 can be implemented by controller 240 using DSP firmware and with a basic set of processing elements. For example, a single time tracking loop 634 and a single data/PN address calculation unit 636 can be time division multiplexed and used to implement all instantiated state machines 630. Controller 240 can maintain a separate register to store the time offset associated with each instantiated state machine 630.

In an embodiment, for the forward link processing in a remote terminal, controller 240 also maintains a frequency tracking loop 638 that locks the frequency of the clock source to the data rate of the data samples. The frequency tracking loop can be designed to determine the amount of phase rotation in the pilot references, use the phase information to determine whether the sampling clock is fast or slow relative to the chip rate, and adjust the frequency of the clock source accordingly. If the sampling clock is frequency locked to the chip rate, a particular number of data samples (e.g., 2048) are provided for each frame. Thus, when the frequency is locked, a frame of samples can be deemed to be received by counting the number of samples being written to buffer 224.

FIG. 6C also shows a block diagram of a specific embodiment of address generator 236 used to generate the addresses for buffer/de-interleaver 234. Address generator 236 includes symbol write address generator 542a and symbol read address generator 542b coupled to latches 544a and 544b, respectively. Address generators 542a and 542b further couple to a multiplexer 546 that selects the generated address from one of address generators 542a and 542b and provides the selected address to buffer/de-interleaver 234.

Each latch 544 stores a value indicative of the first address to be generated by address generator 542 for the segment being processed. The initial values provided to latches 544 are generally related to the values provided to latches 514, but are provided in a manner to account for various factors such as, for example, the processing delay of data processor 230. Symbol read address generator 542a loads the value stored in latch 544a and uses the loaded value as the starting address. Subsequent symbol read addresses can be generated, for example, by incrementing a counter within symbol read address generator 542a.

In an embodiment, buffer/de-interleaver 234 is used to store intermediate and final results of the symbol accumulation for multiple multipaths. Initially, samples for a particular multipath is processed, and the resultant symbols are stored to particular locations in buffer/de-interleaver 234. To simplify the addressing, the symbols for a particular multipath (e.g., the first to be processed) may be stored in buffer/de-interleaver 234 starting at a designated location (e.g., address of zero, $N_S$, and so on). For each subsequent multipath, the demodulated symbols for that multipath can be combined with the corresponding stored symbols for prior processed multipaths. The combined symbols are then stored back to the same locations in buffer/de-interleaver 234. Thus, symbols for multiple processed multipaths are combined "in place" with the corresponding prior-accumulated symbols. When symbols for multiple multipaths are to be combined, address generator 236 generates the proper symbol read and write addresses, as determined by the values stored in latches 544a and 544b.

In many communications systems including the HDR CDMA system, interleaving is used to provide temporal diversity in the transmitted data. The interleaving reduces the likelihood of receiving a string of consecutive errors due to, for example, impulse noise. At the receiver unit, the received symbols are reordered. The reordering can effectively spread a string of symbols received in error over an entire frame, which can improve the likelihood of correct decoding of the received symbols. The interleaving is performed at the transmitter unit such that temporal diversity is achieved prior to the decoding at the receiver unit.

In an embodiment, buffer/de-interleaver 234 is also operated to provide de-interleaving of the processed symbols. In an embodiment, the processed symbols are written to buffer/de-interleaver 234 in sequential order but are read out in a pseudo-random but deterministic order defined by the particular interleaving scheme being implemented. Because the symbols are read out in non-sequential order, buffer/de-interleaver 234 is first filled with the symbols corresponding to the duration over which interleaving is performed. For example, in the HDR CDMA system, interleaving is performed on each frame of data. Thus, at the receiver unit, a complete frame of symbols is processed and stored to buffer/de-interleaver 234. After the entire frame has been processed, the symbols for the frame are read out to the subsequent decoder. In an embodiment, data processing is performed on one frame of data at a time. In this manner, as the current frame is being processed and stored to one section of buffer/de-interleaver 234, the prior processed frame can be retrieved from another section of buffer/de-interleaver 234.

Symbol read address generator 542b includes the necessary circuitry to generate the proper addresses for the symbols to be provided to symbol demodulator and combiner 524 for symbol accumulation, and the symbols to be provided to the subsequent decoder 260 for decoding. The symbol read addresses for these two destinations can be generated in a time division multiplexed manner. For example, symbols can be provided to symbol demodulator and combiner 524 and decoder 260 on alternative symbol read cycles. Alternatively, a group of symbols can be provided to symbol demodulator and combiner 524 followed by a group of symbols to decoder 260.

Figure 7A:
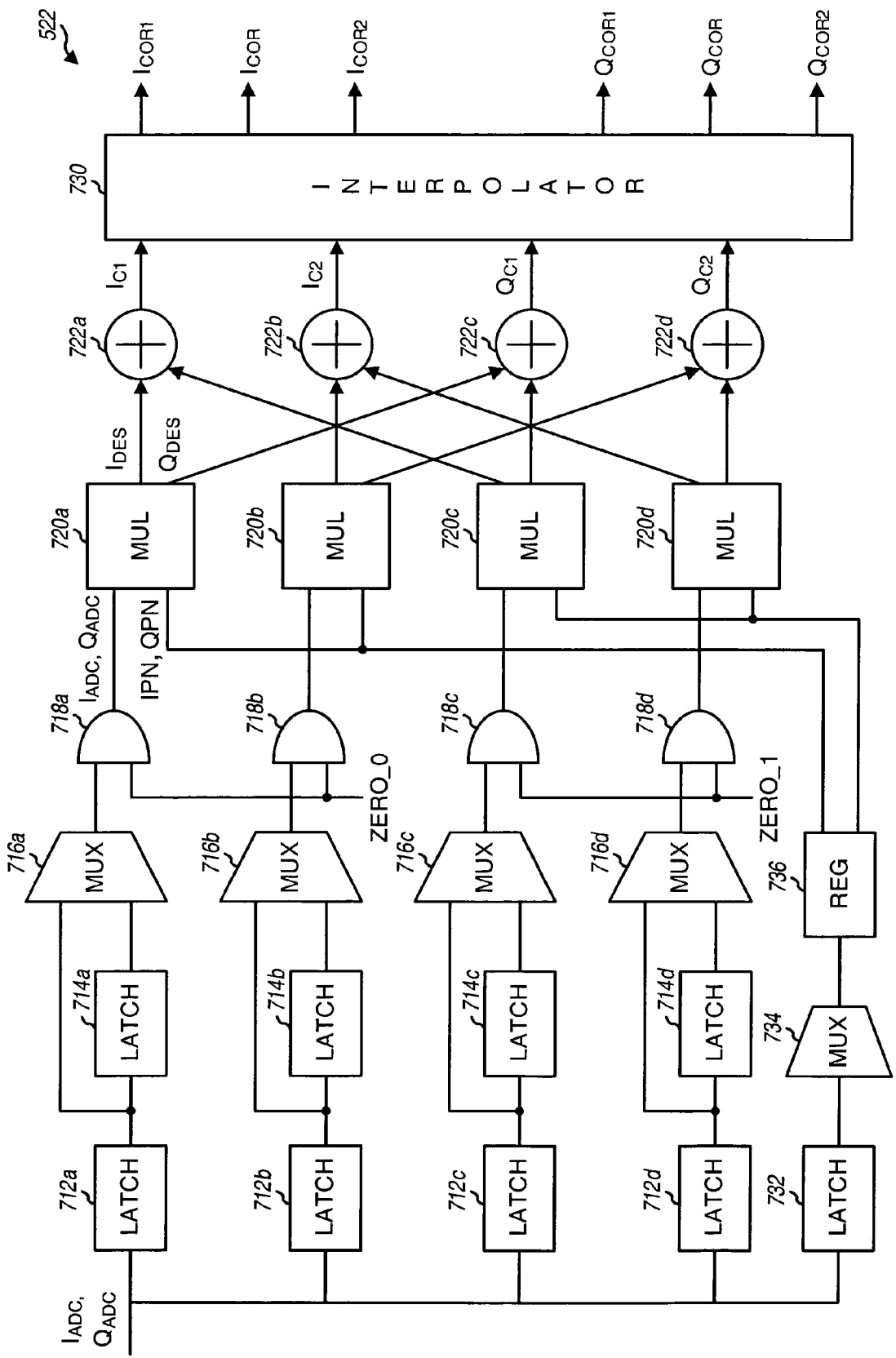
FIG. 7A is a block diagram of a specific embodiment of a correlator within the data processor of FIG. 5.

FIG. 7A is a block diagram of a specific embodiment of correlator 522 within data processor 230. In an embodiment, correlator 522 is designed to support a number of functions including, for example, despreading of the data samples with the complex PN despreading sequences, accumulation of multiple despread samples for each chip period, and interpolation. For enhanced performance, correlator 522 can be designed to operate on multiple (e.g., up to four) complex samples concurrently. Other designs and functions can be implemented for correlator 522 and these are within the scope of the invention.

In an embodiment, for each data read cycle, four pairs of digitized $I_{ADC}$ and $Q_{ADC}$ samples (i.e., four complex data samples) are retrieved from buffer 224 and latched by latches 712a through 712d. On the next data read cycle, the samples from latches 712a through 712d are further latched by latches 714a through 714d, respectively, and the next four pairs of digitized $I_{ADC}$ and $Q_{ADC}$ samples are latched by latches 712a through 712d. In an embodiment, two data samples are provided for each chip period (i.e., doubled sampled) and the double latching by latches 712 and 714 allows for processing of either the on-time (OT) sample or the late (LT) sample of each chip.

Multiplexers 716a through 716d receive the latched samples from latches 712a through 712d, respectively, and the latched samples from latches 714a through 714d, respectively. Each multiplexer 716 provides one of the received samples, depending on whether the processing is to be performed on the on-time or late sample, to a respective AND gate 718. AND gates 718a and 718b also receive the control signal ZERO_0, and AND gates 718c and 718d also receive the control signal ZERO_1. Each AND gate 718 provides either the received sample or a value of zero ("0") to a respective multiplier 720, depending on the control signal ZERO_x.

In a specific embodiment, buffer 224 is designed and operated to also store the IPN and QPN sequences used for despreading the data samples. In an embodiment, for each PN read cycle, a 16-chip segment of the complex PN despreading sequence, corresponding to the data samples being processed, is retrieved from buffer 224, latched by a latch 732, and provided to a multiplexer 734. Multiplexer 734 selects a portion (e.g., a 2-chip portion) of the latched complex PN segment and provides the selected portion to a barrel shift register 736. Register 736 then provides the proper IPN and QPN samples to each of multipliers 720a through 720d.

In a specific embodiment, the data samples are oversampled by the ADCs, possibly decimated, and provided at twice the chip rate (i.e., the sample rate is twice the chip rate). The oversampling allows for detection of strong instances of the received signal with finer time resolution, which can provide improved performance. For the correlator architecture shown in FIG. 7A, four parallel processing paths are provided and up to four complex data samples corresponding to two chips worth of data can be concurrently processed for each cycle of the processing clock. As shown in FIG. 7A, multipliers 720a and 720b perform despreading of two complex data samples (e.g., the on-time and late samples) corresponding to chip index n, and multipliers 720c and 720d perform despreading of two complex data samples corresponding to chip index n+1. Barrel shift register 736 provides the IPN and QPN samples corresponding to chip index n to multipliers 720a and 720b, and the IPN and QPN samples corresponding to chip index n+1 to multipliers 720c and 720d.

Each multiplier 720 performs a complex despread of the complex data samples with the complex PN samples. In the HDR CDMA system, at the transmitter unit, the complex data to be transmitted is spread with the complex PN sequence. The complex spreading can be expressed as:

$$I_{TX}+jQ_{TX}=(I_{DAT}+jQ_{DAT})\ (IPN+jQPN). \text{ Eq} \qquad (1)$$

At the receiver unit, the data can be recovered by performing the complementary complex despreading, which can be expressed as:

$$I_{DES}+jQ_{DES}=(I_{ADC}+jQ_{ADC})\ (IPN-jQPN), \qquad \text{Eq (2)}$$

where $I_{ADC}=I_{TX}+$noise, $Q_{ADC}=Q_{TX}+$noise, $I_{DES}=I_{DAT}+$noise, and $Q_{DES}=Q_{DAT}+$noise.

Figure 7B:
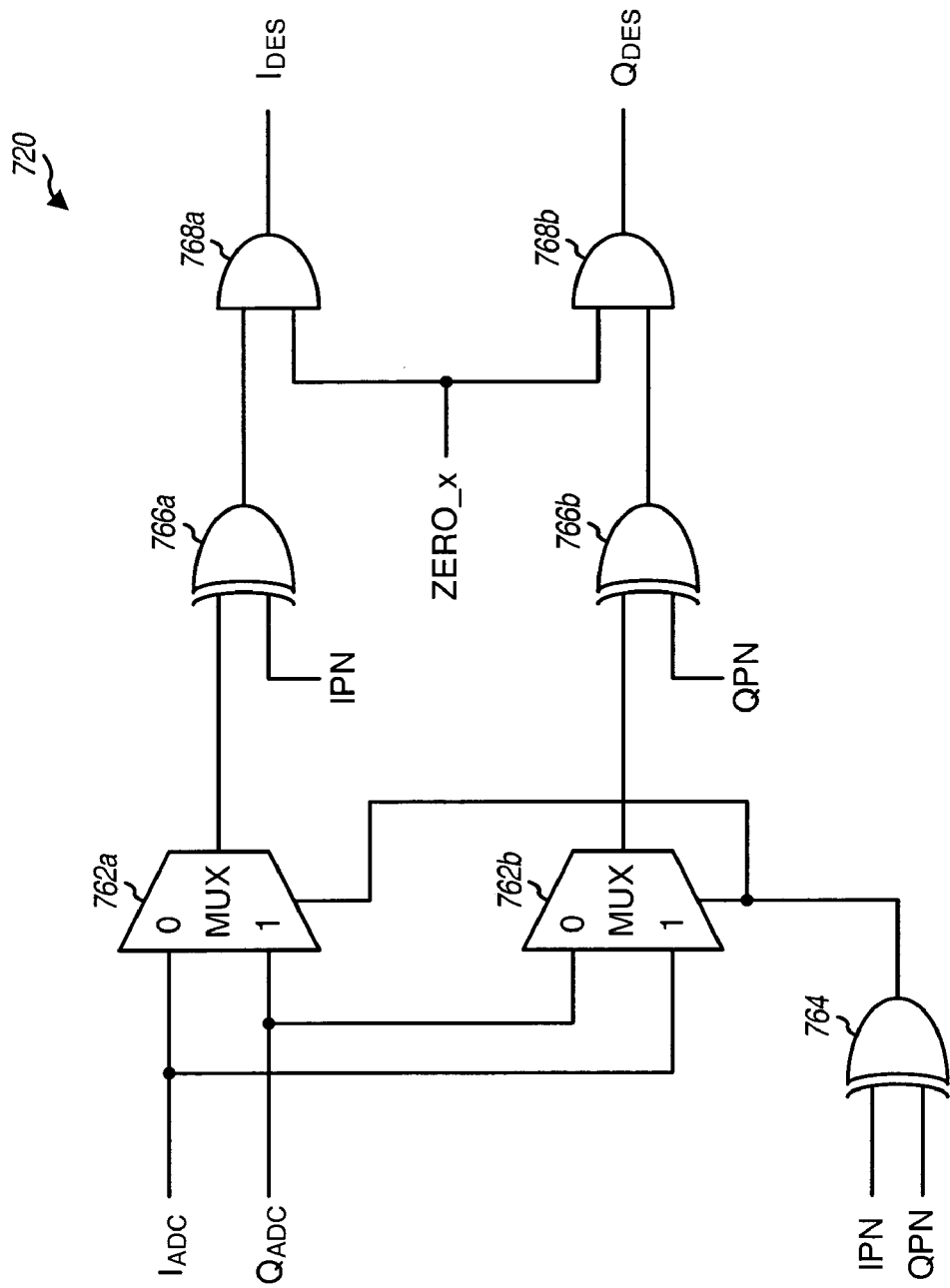
FIG. 7B is a block diagram of a specific embodiment of a multiplier that can perform complex despreading.

FIG. 7B is a block diagram of a specific embodiment of multiplier 720 that implements the complex despreading expressed by equation (2). Within multiplier 720, the complex data sample, $I_{ADC}$ and $Q_{ADC}$, is provided to each of multiplexers 762a and 762b, and the complex PN sample, IPN and QPN, is provided to an exclusive-OR gate 764. Exclusive-OR gate 764 performs an XOR (i.e., multiplication) of the IPN and QPN samples and provides the output to a select input of each of multiplexers 762a and 762b. Each multiplexer 762 selects either the $I_{ADC}$ or $Q_{ADC}$ sample, depending on the value at the select input, and provides the selected sample to an input of a respective exclusive-OR gate 766. Exclusive-OR gates 766a and 766b perform an exclusive-OR function (i.e., multiplication) of the received samples with the IPN and QPN, respectively, and provide the output samples to AND gates 768a and 768b, respectively. Each AND gate 768 also receives the control signal ZERO_x and provides either the received sample or the value "0" based on the control signal ZERO_x. The outputs of AND gates 768a and 768b comprise the complex despread $I_{DES}$ and $Q_{DES}$ sample.

Referring back to FIG. 7A, the despread $I_{DES}$ and $Q_{DES}$ samples from multipliers 720a through 720d are selectively combined by summers 722a through 722d to generate a set of combined $I_C$ and $Q_C$ samples. Specifically, summer 722a combines the despread $I_{DES}$ samples from multipliers 720a and 720c to generate the first combined $I_{C1}$ sample corresponding to the first half of a chip, summer 722b combines the despread $I_{DES}$ samples from multipliers 720b and 720d to generate the second combined $I_{C2}$ sample corresponding to the second half of a chip, summer 722c combines the despread $Q_{DES}$ samples from multipliers 720a and 720c to generate the first combined $Q_{C1}$ sample, and summer 722d combines the despread $Q_{DES}$ samples from multipliers 720b and 720d to generate the second combined $Q_{C2}$ sample. Summers 722 can be used to combine half samples from different chips before the interpolation, to simplify the design of the interpolator. AND gates 718 and the ZERO_0 and ZERO_ signals can be used to disable the summing of samples from two chips when this is not applicable, such as in the forward link symbol demodulation where each chip may contain a complex or higher order modulated symbol.

In the specific embodiment shown in FIG. 7A, correlator 522 includes an interpolator 730 that can be configured to generate sample values at various time offsets. For example, if two complex data samples are provided for each chip (i.e., at time offset of $0T_C$ and $0.5T_C$, where $T_C$ is the period of a chip), interpolator 730 can be used to generate interpolated samples at other time offsets such as, for example, $0.125T_C$, $0.25T_C$, $0.375T_C$, $0.625T_C$, $0.75T_C$, $0.875T_C$, and so on. The time resolution of the interpolation is dependent on the particular design of interpolator 730. Interpolator 730 can be used, for example, to identify a multipath with a finer time resolution than the sample period (e.g., finer than $0.5T_C$).

FIG. 7C is a diagram that illustrates linear interpolation. As shown in FIG. 7C, the sample at sample index (n) has an amplitude of A and the sample at the subsequent sample index (n+1) has an amplitude of B. The sample period is normalized to a value of 1.0. The samples at sample indices (n) and (n+1) can be used to estimate the values for samples at other time offsets such as, for example, 0.25, 0.50, 0.75, and so on. For linear interpolation, the amplitude of the sample at time offset of 0.25 can be estimated as 0.75A +0.25B, the amplitude of the sample at time offset of 0.50 can be estimated as 0.50A +0.50B, and the amplitude of the sample at time offset of 0.75 can be estimated as 0.25A +0.75B. By scaling the samples by a factor of four, the amplitudes of the samples at time offsets of 0.0, 0.25, 0.50, 0.75, and 1.0 can be expressed as 4A, 3A+B, 2A+2B, A+3B, and 4B, respectively.

Figure 7D:
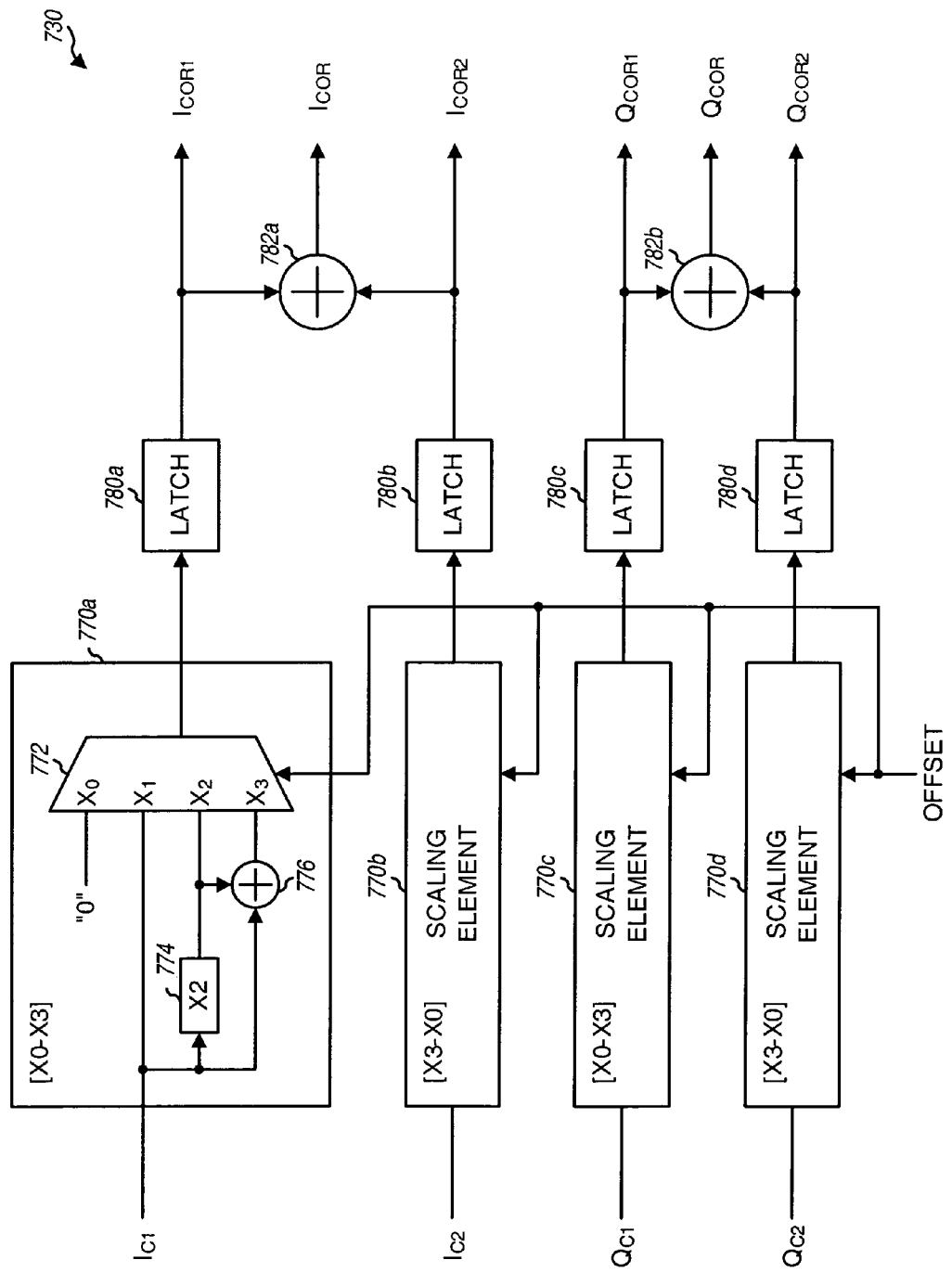
FIG. 7D is a block diagram of a specific embodiment of an interpolator.

FIG. 7D is a block diagram of a specific embodiment of interpolator 730. In this embodiment, interpolator 730 is implemented as a linear interpolator capable of providing interpolated samples at three different time offsets (e.g., 0.25, 0.50, and 0.75). Interpolator 730 is also designed with the capability to (1) provide zero value outputs, (2) feed through the received samples, (3) provide interpolated samples, or a combination thereof.

The combined $I_{C1}$, $I_{C2}$, $Q_{C1}$ and $Q_{C2}$ symbols from summers 722a through 722d are provided to scaling elements 770a through 770d, respectively. Within each scaling element 770, the sample is provided to an X1 input of a multiplexer 772, an input of a times-two element 774, and an input of a summer 776. Times-two element 774 scales the received sample by a factor of two and provides the scaled output to an X2 input of multiplexer 772 and to the other input of summer 776. Summer 776 sums the input sample and the X2 scaled sample and provides the summed output to an X3 input of multiplexer 772. Multiplexer 772 also receives a zero ("0") at its X0 input. Multiplexer 772 than selects a sample at one of its inputs, based on a control signal OFFSET, and provides the selected sample to a latch 780.

As shown in FIG. 7D, scaling elements 770a and 770b are configured in a complementary manner, and scaling elements 770c and 770d are also configured in a complementary manner. For a particular time offset of 0.25, 0.50, or 0.75 (as expressed by the control signal OFFSET), the value of $3I_{C1}$, $2I_{C1}$, or $1I_{C1}$, respectively, is provided from scaling element 770a to latch 780a, and the value of $I_{C2}$, $2I_{C2}$, or $3I_{C2}$, respectively, is provided from scaling element 770b to latch 780b. The samples from latches 780a and 780b are then provided to a summer 782a, and the samples from latches 780c and 780d are provided to a summer 782b. The output from summer 782a comprises the interpolated I sample, and the output from summer 782b comprises the interpolated Q sample. The interpolated samples from summers 782a and 782b are provided as the correlated $I_{COR}$ and $Q_{COR}$ samples from correlator 522. The outputs from latches 780a through 780d also comprise the (non-interpolated) correlated $I_{COR1}$, $I_{COR2}$, $Q_{COR1}$, and $Q_{COR2}$ samples, respectively.

Interpolator 730 can be operated in one of a number of different configurations. For example, as noted above, interpolator 730 can be configured to zero out the outputs, feed through the received samples, provide interpolated samples, or a combination of the above. The zero value at the X0 input of multiplexers 772 is selected to zero out the output, and the sample at the X1 input is selected to feed through the received samples. And to perform interpolation, the X1, X2, or X3 value is selected by one multiplexer 772 and the complementary X3, X2, or X1 value is selected by the other multiplexer 772 in the complementary pair.

In an embodiment and as noted above, two data samples are provided for each chip period and processed (e.g., despread) by correlator 522. The two samples for each chip can be combined within interpolator 730 to provide a single despread sample for each chip period. To combine the I samples for each chip, the samples at the X1 inputs of the multiplexers for scaling elements 770a and 770b are selected and summed by summer 782a to provide the combined I sample. Similarly, to combine the Q samples for each chip period, the samples at the X1 inputs of the multiplexers for scaling elements 770c and 770d are selected and summed by summer 782b to provide the combined Q sample.

In the HDR CDMA system, the transmitted traffic data is partitioned into a number of data streams, and each data stream is covered by a particular Walsh code. As defined by the HDR CDMA system, each Walsh code corresponds to a respective Walsh symbol having a length of (up to) 16 chips. To channelize the data, each data bit is covered with the 16-chip Walsh symbol assigned to the channel on which the bit is transmitted. For each Walsh symbol period, up to 16 Walsh symbols for up to 16 data bits to be transmitted on up to 16 channels are generated and combined. The 16 Walsh symbols are orthogonal to one another and, in the absence of distortion, can be individually recovered at the receiver unit because the cross correlation between orthogonal sequences is (ideally) zero.

Figure 8A:
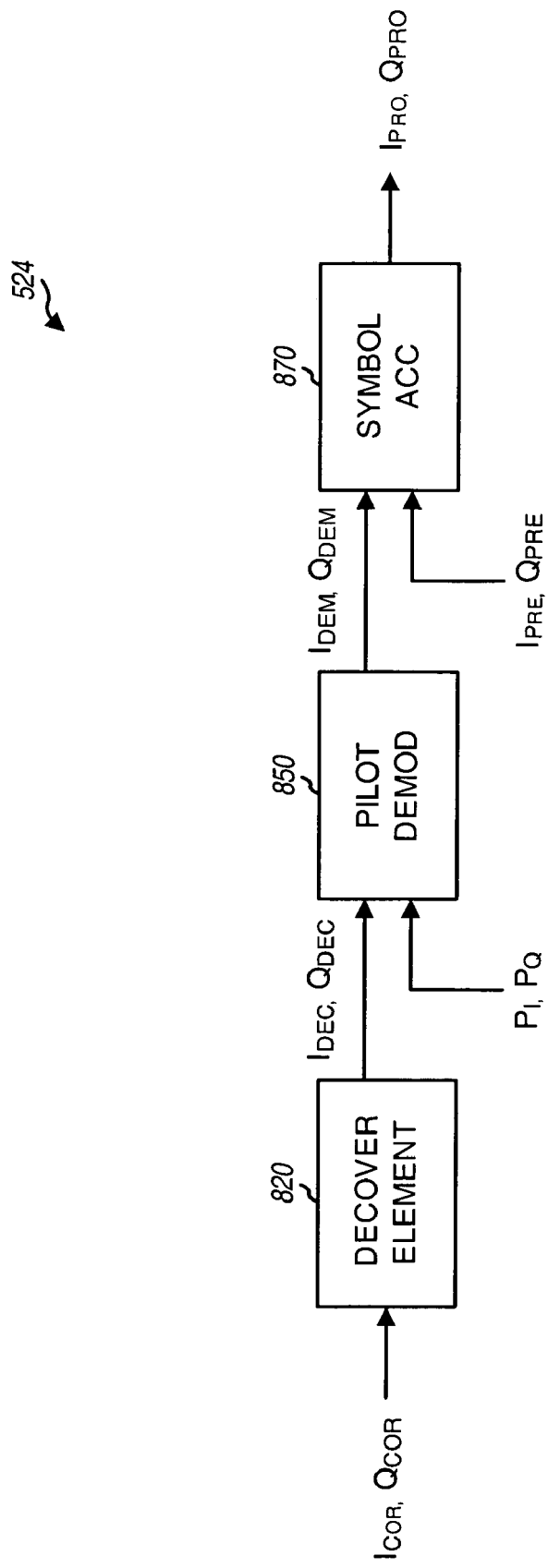
FIG. 8A is a block diagram of a specific embodiment of a symbol demodulator and combiner within the data processor of FIG. 5.

FIG. 8A is a block diagram of a specific embodiment of symbol demodulator and combiner 524 within data processor 230. Pairs of correlated samples from correlator 522 are provided to a decover element 820 that decovers the samples with channelization (e.g., Walsh) symbols to provide decovered symbols. The decovered data symbols and the complex pilot symbols are provided to a pilot demodulator 850 that coherently demodulates the data with the pilot to generate demodulated symbols. The demodulated symbols are then provided to a symbol accumulator 870 and may be combined with other demodulated symbols from other signal paths or other redundant transmissions. The output from symbol accumulator 870 comprises the processed symbols that are then provided to buffer/de-interleaver 234 (see FIG. 5).

Symbol demodulator and combiner 524 can be designed to operate on a number of samples (e.g., four, eight, sixteen, and so on) per clock cycle. The number of samples that can be processed concurrently by symbol demodulator and combiner 524 is typically dependent on a number of factors such as, for example, the rate at which the samples can be provided to symbol demodulator and combiner 524, the width of the elements within symbol demodulator and combiner 524, and so on.

Figure 8B:
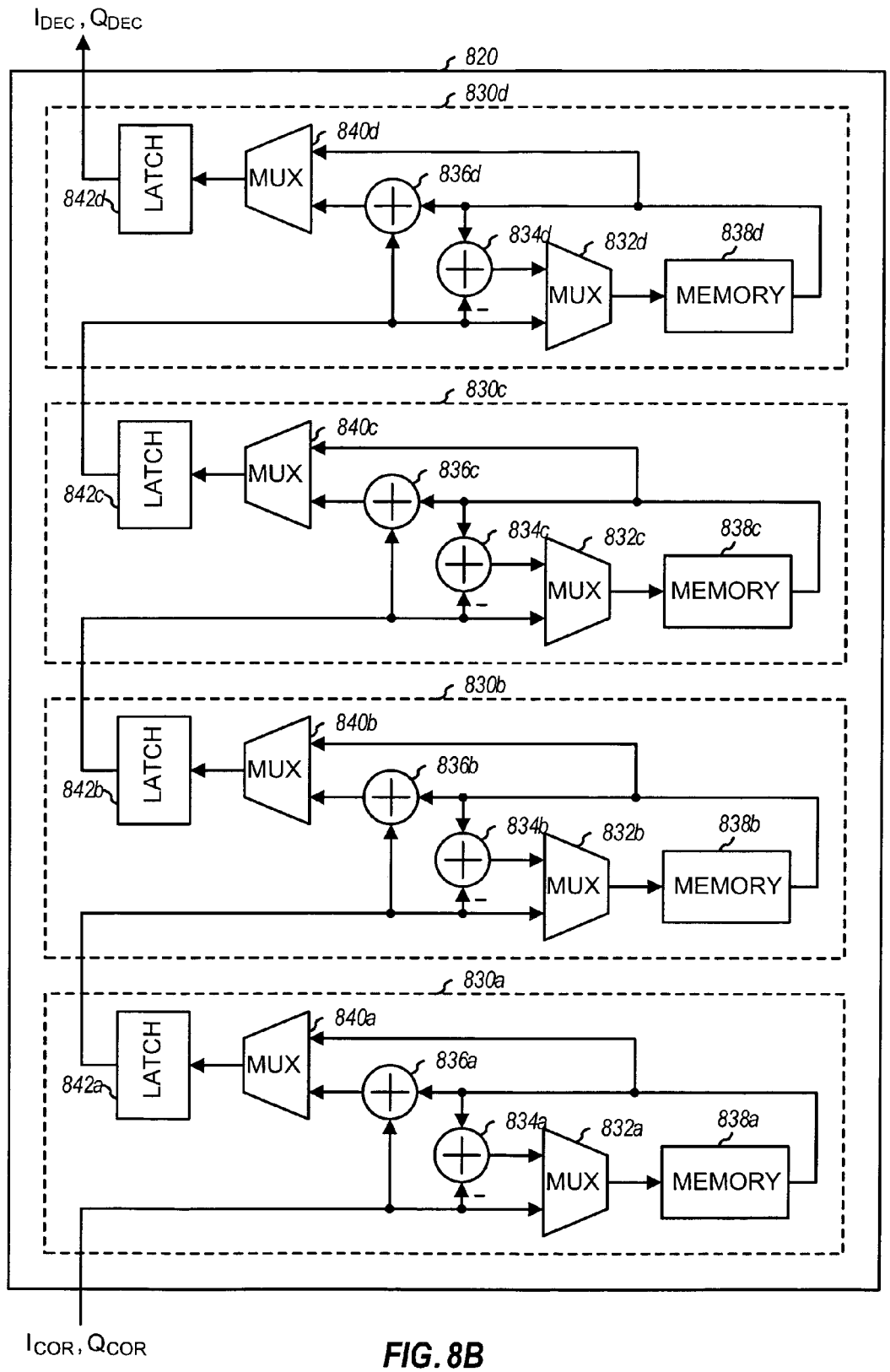
FIG. 8B is a block diagram of a specific embodiment of a fast Hadamard transform (FHT) element.

FIG. 8B is a block diagram of a specific embodiment of a fast Hadamard transform (FHT) element that can be used to implement decover element 820. In an embodiment, the correlated $I_{COR}$ and $Q_{COR}$ samples are serially and alternately provided to FHT element 820, one sample per clock cycle. In an embodiment, FHT element 820 is designed with the capability to perform Walsh decover of the received samples with one or more Walsh symbols of length N, where N is programmable.

FHT element 820 can be designed to operate in one of a number of different configurations. For example, FHT element 820 can be configured to decover the input samples with a particular Walsh symbol of a particular length N. In this configuration, FHT element 820 receives a block of N $I_{COR}$ samples and N $Q_{COR}$ samples (i.e., the N-chip $I_{COR}$ and $Q_{COR}$ vector pair) and performs an N-chip Walsh decovering on the received sample block with the particular Walsh symbol to generate a pair of decovered $I_{DEC}$ and $Q_{DEC}$ symbols.

Alternatively, FHT element 820 can be configured to decover the received samples with all N Walsh symbols. In this configuration, FHT element 820 performs the equivalent function of multiplying the N-by-N Hadamard matrix (corresponding to the N Walsh symbols, with each Walsh symbol having a length of N chips) by a vector comprising the N pairs of $I_{COR}$ and $Q_{COR}$ samples to generate N pairs of decovered $I_{DEC}$ and $Q_{DEC}$ symbols. Decovering with all N Walsh symbols is especially advantageous, for example, in the HDR CDMA system in which data may be transmitted over more than one channel to a particular terminal.

In an embodiment, to expedite the processing of the $I_{COR}$ and $Q_{COR}$ samples and to minimize the amount of required circuitry, FHT element 820 is configured to process the $I_{COR}$ and $Q_{COR}$ samples on alternate clock cycles. This allows a single FHT element 820 to provide decovered $I_{DEC}$ and $Q_{DEC}$ symbols to the subsequent processing unit on alternate clock cycles, with the $Q_{DEC}$ symbols delayed from the corresponding $I_{DEC}$ symbols by a single clock cycle. The subsequent processing unit can then be designed to operate on the decovered $I_{DEC}$ and $Q_{DEC}$ symbols as they are provided from the FHT element 820, without having to wait for all $I_{COR}$ symbols in the block to be processed and then the $Q_{COR}$ symbols to be processed. FHT element 820 can be configured to operate on alternating $I_{COR}$ and $Q_{COR}$ samples by properly managing the memory elements within FHT element 820.

FHT element 820 is a serial processing engine that receives samples serially, one sample per clock cycle, and after a particular processing delay provides a decovered symbol for each clock cycle. The decovered symbols for a particular block of samples are delayed by a particular number of clock cycles, with the delay being determined in part by the length of the Walsh symbol. For each block of N data samples, FHT element 820 serially provides N decovered symbols corresponding to the N Walsh symbols. The decovered symbols from FHT element 820 are the correlations between the input samples and the Walsh symbols.

A fast Hadamard transform element can perform decovering for Walsh symbols of length $N=2^L$ using L bufferfly transform elements. In the specific embodiment shown in FIG. 8B, to decover 16-chip Walsh symbols, FHT element 820 includes four bufferfly transform elements 830a through 830d coupled in series. Each bufferfly transform element 830 performs a subset of the required sum and difference operations. Each successive bufferfly transform element 830 further performs the cross coupling of the results from the preceding butterfly transform.

Within each bufferfly transform element 830, the input sample is provided to an input of a multiplexer 832, a subtracting input of a summer 834, and a first summing input of a summer 836. Multiplexer 832 also receives the output of summer 834 and alternately provides the output from summer 834a or the input sample to a memory element 838. The output from memory element 838 is provided to a summing input of summer 834, a second summing input of summer 836, and one input of a multiplexer 840 that also receives the output from summer 836. Multiplexer 840 alternately provides the output from memory element 838 and the output from summer 836 to a latch 842. The output of latch 842 is provided to the input of the next bufferfly transform element 830. The output of the last bufferfly transform element 830d comprises the decovered symbol.

A design and operation of a FHT element is described in further detail in U.S. Pat. No. 5,561,618, entitled "METHODS AND APPARATUS FOR PERFORMING A FAST HADAMARD TRANSFORM," issued Oct. 1, 1996, assigned to the assignee of the present invention and incorporated herein by reference.

In the embodiment shown in FIG. 8B, FHT element 820 can be programmed to perform a fast Hadamard Transform (i.e., decovering) of variable length (e.g., 1, 2, 4, 8, or 16). The maximum FHT length supported by FHT element 820 is determined by the number of bufferfly transform elements 830 employed, and shorter length FHT can be performed by bypassing one or more bufferfly transform elements 830. Longer length FHT can also be performed by employing additional bufferfly transform elements 830.

In the embodiment shown in FIG. 8B, the $I_{COR}$ and $Q_{COR}$ samples are provided to FHT element 820 on the same bus in alternating clock cycles. The time division multiplexing is achieved by a Walsh counter (not shown in FIG. 8B) that is cleared when the first correlated sample reaches the front of FHT element 820. The time division multiplexing allows for sharing of the hardware such that FHT element 820 can perform decovering of both $I_{COR}$ and $Q_{COR}$ samples. In another embodiment, the $I_{COR}$ and $Q_{COR}$ samples are provided in parallel to two FHT elements, with each FHT element configured to perform decovering of a respective block of $I_{COR}$ or $Q_{COR}$ samples.

Figure 8C:
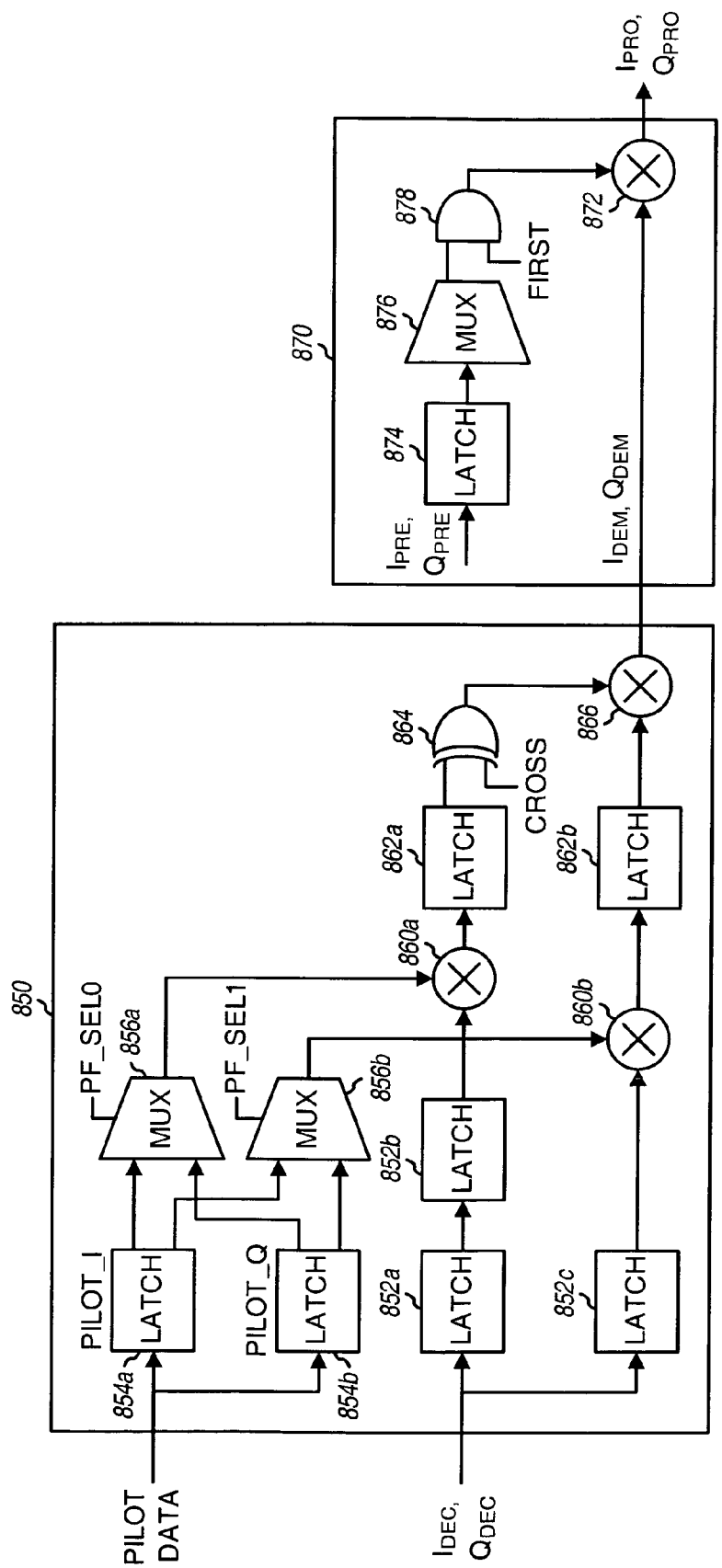
FIG. 8C is a block diagram of a specific embodiment of a pilot demodulator.

FIG. 8C is a block diagram of a specific embodiment of pilot demodulator 850. The decovered $I_{DEC}$ and $Q_{DEC}$ symbols from FHT element 820 and the complex pilot $P_I$ and $P_Q$ symbols are provided to pilot demodulator 850, which coherently demodulates the decovered symbols with the pilot. The pilot demodulation can be expressed as:

$$\begin{aligned} I_{DEM} + jQ_{DEM} &= (I_{DEC} + jQ_{DEC})(P_I - jP_Q) \\ &= (I_{DEC}P_I + Q_{DEC}P_Q) + \\ &\quad j(-I_{DEC}P_Q + Q_{DEC}P_I) \\ &= [\text{dot}(IQ, P) - j\text{cross}(IQ, P)]. \end{aligned} \quad \text{Eq (3)}$$

The demodulated $I_{DEM}$ and $Q_{DEM}$ symbols can be expressed as:

$$I_{DEM} = (I_{DEC}P_I + Q_{DEC}P_Q), \quad \text{and Eq (4)}$$

$$Q_{DEM} = (-I_{DEC}P_Q + Q_{DEC}P_I) \quad \text{Eq (5)}$$

Within demodulator 850, the decovered $I_{DEC}$ and $Q_{DEC}$ symbols are provided (e.g., on alternating clock cycles) to latches 852a and 852c, respectively. The output from latch 852a is further latched by a latch 852b to time-align the $I_{DEC}$ and $Q_{DEC}$ symbols. The outputs from latches 852b and 852c comprise complex data symbols. Similarly, the $P_I$ and $P_Q$ pilot symbols are latched by latches 854a and 854b, respectively. The outputs from latches 854a and 854b are provided to each of multiplexers 856a and 856b. Each multiplexer 856 selects either the PI or PQ pilot symbol, depending on whether a dot or cross product is being performed. The complex pilot symbols from multiplexers 856a and 856b are provided to multipliers 860a and 860b, respectively, which also receive the complex data symbols from latches 852b and 852c, respectively. Each multiplier 860 performs a multiply of one component (i.e., $I_{DEC}$ or $Q_{DEC}$) of the complex data symbol with one component (i.e., $P_I$ or $P_Q$) of the complex pilot symbol and provides the resultant product to a respective latch 862.

The output from latch 862a is provided to an exclusive-OR gate 864 that also receives a control signal CROSS. The output from latch 862b and the output from exclusive-OR gate 864 are provided to a summer 866 that sums the symbols and provides the summed outputs to symbol accumulator 870.

From equation (4), the demodulated $I_{DEM}$ symbol can be generated by multiplying the $I_{DEC}$ data symbol with the $P_I$ pilot symbol by multiplier 860a, multiplying the $Q_{DEC}$ data symbol with the $P_Q$ pilot symbol by multiplier 860b, and combining the results from multipliers 860a and 860b by summer 866.

Similarly, from equation (5), the demodulated $Q_{DEM}$ symbol can be generated by multiplying the $I_{DEC}$ data symbol with the $P_Q$ pilot symbol by multiplier 860a, multiplying the $Q_{DEC}$ data symbol with the $P_I$ pilot symbol by multiplier 860b, inverting the result from multiplier 860a, and combining the result from multiplier 860b and the inverted result from exclusive-OR gate 864 by summer 866. Thus, to generate the demodulated $Q_{DEM}$ symbol, multiplexers 856a and 856b swap the $P_I$ and $P_Q$ pilot symbols provided to multipliers 860a and 860b, and exclusive-OR gate 864 inverts the result from multiplier 860a.

FIG. 8C also shows a block diagram of a specific embodiment of symbol accumulator 870. The demodulated $I_{DEM}$ and $Q_{DEM}$ symbols from pilot demodulator 850 are provided serially to a summer 872. The $I_{PRE}$ and $Q_{PRE}$ symbols from previous computations are retrieved (e.g., in pairs) from buffer/de-interleaver 234 and provided to a latch 874. A multiplexer 876 couples to latch 874 and selects either the $I_{PRE}$ or $Q_{PRE}$ symbols to provide to an AND gate 878. AND gate 878 also receives a control signal FIRST, which zeros out the output from AND gate 878 if no symbol accumulation is to be performed. The output from AND gate 878 is provided to summer 872 and summed with the received $I_{DEM}$ or $Q_{DEM}$ symbol. The output from summer 872 comprises the accumulated (i.e., processed) $I_{PRO}$ or $Q_{PRO}$ symbol that is provided back to buffer/de-interleaver 234.

Figure 9:
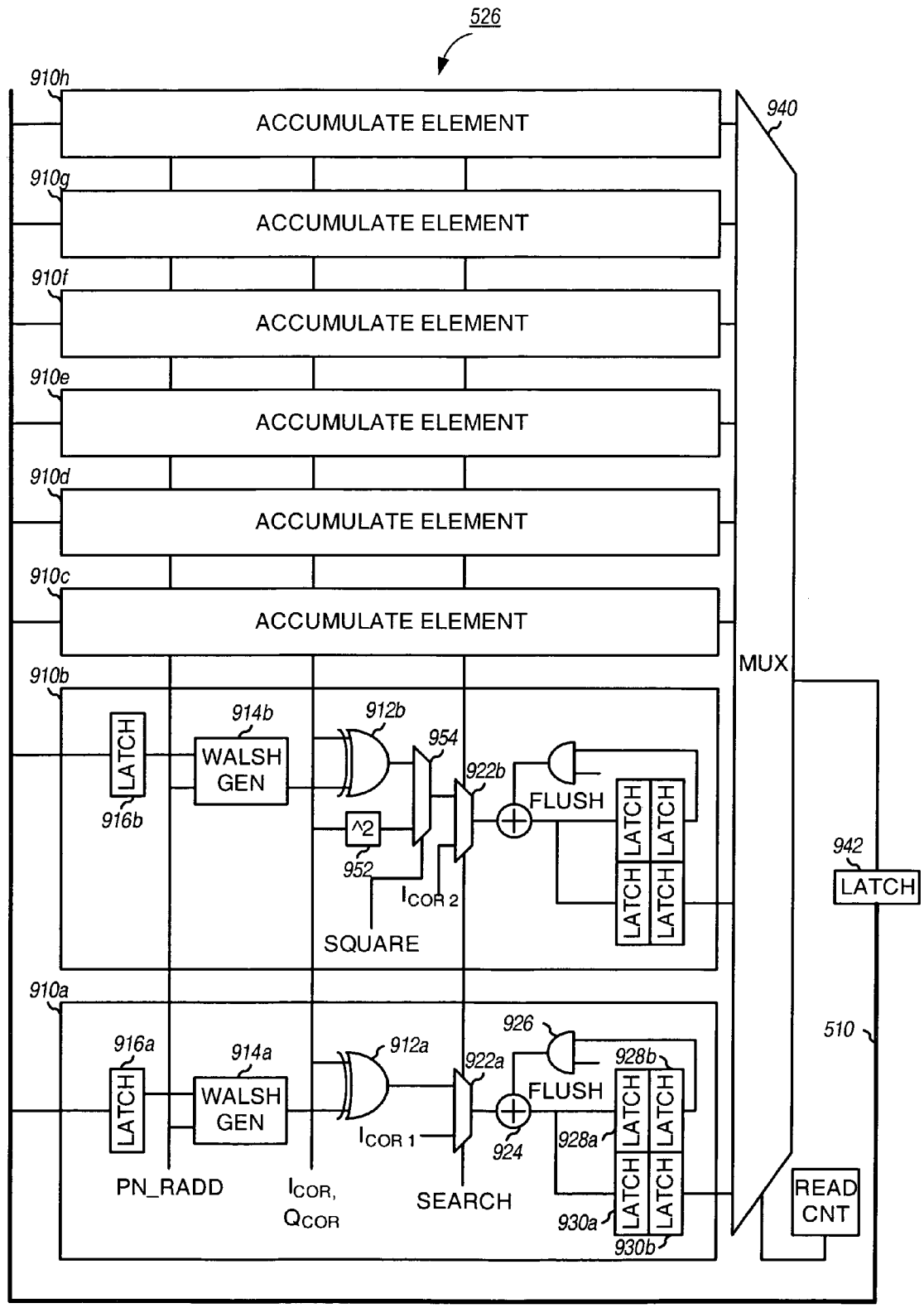
FIG. 9 is a block diagram of a specific embodiment of an accumulator used for processing traffic data, pilot reference, and other signaling data.

FIG. 9 is a block diagram of a specific embodiment of accumulator 526 within data processor 230, which can be used for processing traffic data, pilot reference, and other signaling data. At the user terminal, accumulator 526 can be used to search for strong instances of the received signal, to recover the pilot reference, to extract the power control bit, and so on. At the base station, accumulator 526 can be used to perform the above functions and can also be used to process for other signaling information such as, for example, a data request (DRC) message.

In the specific embodiment shown in FIG. 9, the correlated $I_{COR}$ and $Q_{COR}$ samples from correlator 522 are provided to a set of eight decover and accumulate elements 910a through 910h. Different number of decover and accumulate elements 910 can be used and are within the scope of the invention. Within each decover and accumulate element 910, the correlated $I_{COR}$ or $Q_{COR}$ samples are provided to an exclusive-OR gate 912 that also receives a Walsh symbol from a Walsh generator 914. Walsh generator 914 can be programmed to generate a particular Walsh symbol by loading the corresponding Walsh code in an associated latch 916. Thus, the eight decover and accumulate elements 910a through 910h can be programmed to perform decovering on a particular block of $I_{COR}$ and $Q_{COR}$ samples with eight different Walsh symbols.

On the forward link, one decover element can be used to process power control data. On the reverse link, eight decover elements can be used for demodulating data rate control (DRC) data and performing the FHT as a DFT (i.e., non-fast).

Within each decover and accumulate element 910, exclusive-OR gate 912 performs the decovering of the data samples with the Walsh symbol and provides the decovered samples to one input of a multiplexer 922. The other input of multiplexer 922 receives respective correlated samples (i.e., $I_{COR1}$, $I_{COR2}$, $Q_{COR1}$, or $Q_{COR2}$) from correlator 522. Depending on the particular task being performed, multiplexer 922 provides either the decovered samples from exclusive-OR gate 912 or the correlated samples to a summer 924. Summer 924 also receives a previously latched sample from an AND gate 926, sums the received samples, and provides the accumulated output to a first set of registers 928a and 928b (coupled in series) and a second set of registers 930a and 930b (also coupled in series). The latched output from latch 928b and a control signal FLUSH/are provided to the inputs of AND gate 926, which provides a value of zero to summer 924 if the control signal FLUSH/is low and the latched output if the control signal FLUSH/is high. The latched output from latch 930b comprises the accumulated symbol, and is provided to one input of a multiplexer 940.

Multiplexer 940 receives the accumulated symbols from all eight decover and accumulate elements 910a through 910h and provides the received symbols sequentially to a latch 942 that further couples to data bus 510. The accumulated symbols can then be retrieved from latch 942 by controller 240.

As shown in FIG. 9, the correlated $I_{COR}$ and $Q_{COR}$ samples are also provided to a squarer 952 within decover and accumulate element 910b. Squarer 952 squares the received samples and provides the squared samples to one input of a multiplexer 954, which also receives the decovered samples from exclusive-OR gate 912b. Multiplexer 954 then provides either the squared samples or the decovered samples to multiplexer 922b, depending on a control signal SQUARE. Squarer 952 supports the computation of a pilot carrier-to-interference energy estimate, which is used to estimate the quality of the signal link.

Accumulator 526 can be programmed to perform a number of tasks. For example, accumulator 526 can be programmed to simultaneously decover up to eight different channels. In the embodiment shown in FIG. 9, the correlated $I_{COR}$ and $Q_{COR}$ samples are provided to each decover and accumulate element 910 in a time division multiplexed manner (i.e., $I_{COR}$, $Q_{COR}$, $Q_{COR}$, $Q_{COR}$ and so on). The two latches 928a and 928b in the first set of latches support time division multiplexed accumulation of the $I_{COR}$ and $Q_{COR}$ samples.

Accumulator 526 can also be programmed to assist in the search for strong instances of the received signal. For example, accumulator 526 can be configured to accumulate I, Q vectors for different offsets in each of eight accumulators for subsequent energy squaring. If the pilot reference is covered with Walsh code zero, decovering is not necessary at the receiver unit. In the embodiment shown, accumulator 526 can be programmed to concurrently process up to four different time offsets, with each time offset being processed by a respective pair of decover and accumulate elements 910.

In certain embodiments of the invention, micro-controller 232 is provided to receive tasks dispatched by controller 240 and to direct the operation of various elements of receiver unit 200 to execute the dispatched tasks. Each task can be defined to include a series of steps of operation or a number of other tasks. For example, a task may be dispatched to process a particular multipath at a particular time offset, to search for a strong signal instance within a particular time window, and so on. The search task may be achieved by directing correlator 522 and accumulator 526 to correlate a pilot signal over a particular time interval (e.g., 96 chips) at a specified PN offset. A task may also be dispatched to process all assigned multipaths, to search for strong signal instances at multiple time offsets, and so on. In an embodiment, micro-controller 232 instantiates an appropriate task state machine for each received task and maintains the task state machine for the duration of the task. Depending on the particular task being processed, micro-controller 232 may further instantiate one or more additional task state machines for a lower hierarchical task. Micro-controller 232 may be configured to inform controller 240 when a particular task is completed.

The processing to be performed for search tasks, data processing tasks, signaling processing tasks, and other tasks are described in further detail in the following patents and patent applications, all of which are assigned to the assignee of the present invention and incorporated herein by reference in their entirety:

1) U.S. Pat. Nos. 5,644,591 and 5,805,648, both entitled "METHOD AND APPARATUS FOR PERFORMING SEARCH ACQUISITION IN A CDMA COMMUNICATIONS SYSTEM,"
2) U.S. Pat. Nos. 5,867,527 and 5,867,527, both entitled "METHOD OF SEARCHING FOR A BURSTY SIGNAL;"
3) U.S. Pat. No. 5,764,687, entitled "MOBILE DEMODULATOR ARCHITECTURE FOR A SPREAD SPECTRUM MULTIPLE ACCESS COMMUNICATION SIGNAL;"
4) U.S. Pat. No. 5,577,022, entitled "PILOT SIGNAL SEARCHING TECHNIQUE FOR A CELLULAR COMMUNICATIONS SIGNAL;"
5) U.S. Pat. No. 5,654,979 entitled "CELL SITE DEMODULATION ARCHITECTURE FOR A SPREAD SPECTRUM MULTIPLE ACCESS COMMUNICATION SYSTEMS;"
6) U.S. patent application Ser. No. 08/987,172, entitled "MULTI CHANNEL DEMODULATOR," filed Dec. 9, 1997, now issued U.S. Pat. No. 6,639,906, issued Oct. 28, 2003 to Levin; and
7) U.S. patent application Ser. No. 09/283,010, entitled "PROGRAMMABLE MATCHED FILTER SEARCHER," filed Mar. 31, 1999, now issued U.S. Pat. No. 6,363,108, issued Mar. 26, 2002 to Agrawal et al.

Figure 10:
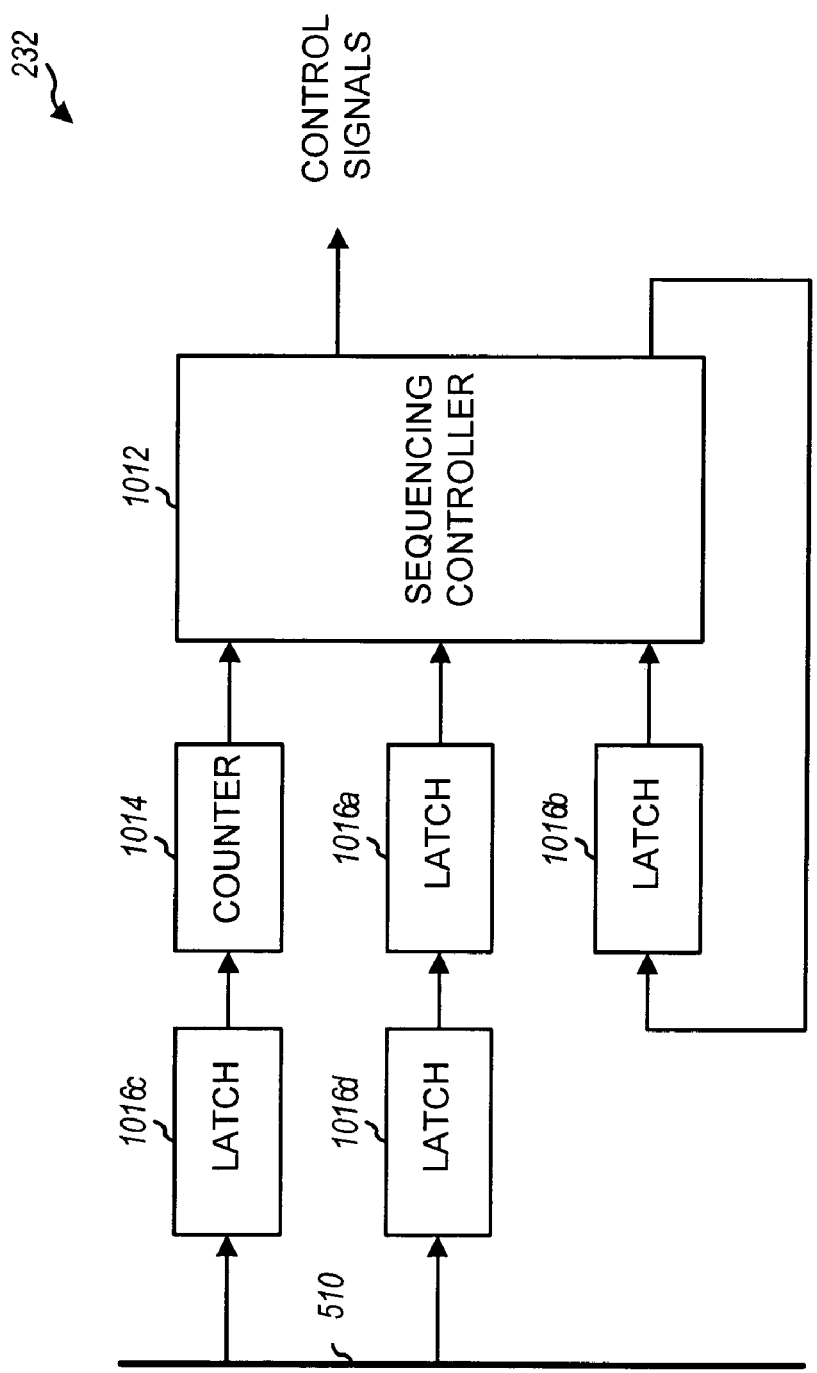
FIG. 10 is a block diagram of a specific embodiment of a micro-controller that can be used to control the operation of the elements of the receiver unit.

FIG. 10 is a block diagram of a specific embodiment of micro-controller 232 that can be used to control the operation of the elements of receiver unit 200 (e.g., buffer 224 and data processor 230). Micro-controller 232 includes a sequencing controller 1012 coupled to a counter 1014 and to latches 1016a and 1016b. Counter 1014 and latch 1016a further couple to latches 1016c and 1016d, respectively, which further couple to data bus 510.

Latch 1016b stores the state of micro-controller 232, and can be integrated within sequencing controller 1012. Latch 1016d receives from data bus 510 a word descriptive of the task dispatched by controller 240. Latch 1016c receives from data bus 510 one or more parameter values to be applied for the dispatched task. Such parameter values may specify, for example, the time interval over which a search function is to be performed. During execution of the task, counter 1014 counts down the designated time interval and provides to sequencing controller 1012 a signal indicative of the end of the time interval.

In an embodiment, to simplify the design and reduce circuit complexity and costs, sequencing controller 1012 is implemented using combinatorial logic. The logic implements the required task state machines used to sequence through the dispatched tasks. Each task state machine provides the appropriate control signals that direct the operation of various elements within receiver unit 200 such as, for example, buffer 224, correlator 522, symbol demodulator and combiner 524, accumulator 526, and buffer/de-interleaver 234. The control signals sequence through various functions and control the buffers and processing elements in order to perform the dispatched task. For example, the control signals control various multiplexers in FIG. 6C (e.g., multiplexers 612, 622, and 546) to select the proper inputs to the multiplexers to be provided to buffer 224 and buffer/de-interleaver 234. Sequencing controller 1012 further directs the operation of various address generators 512 and 542 to generate the required addresses.

Figure 11A:
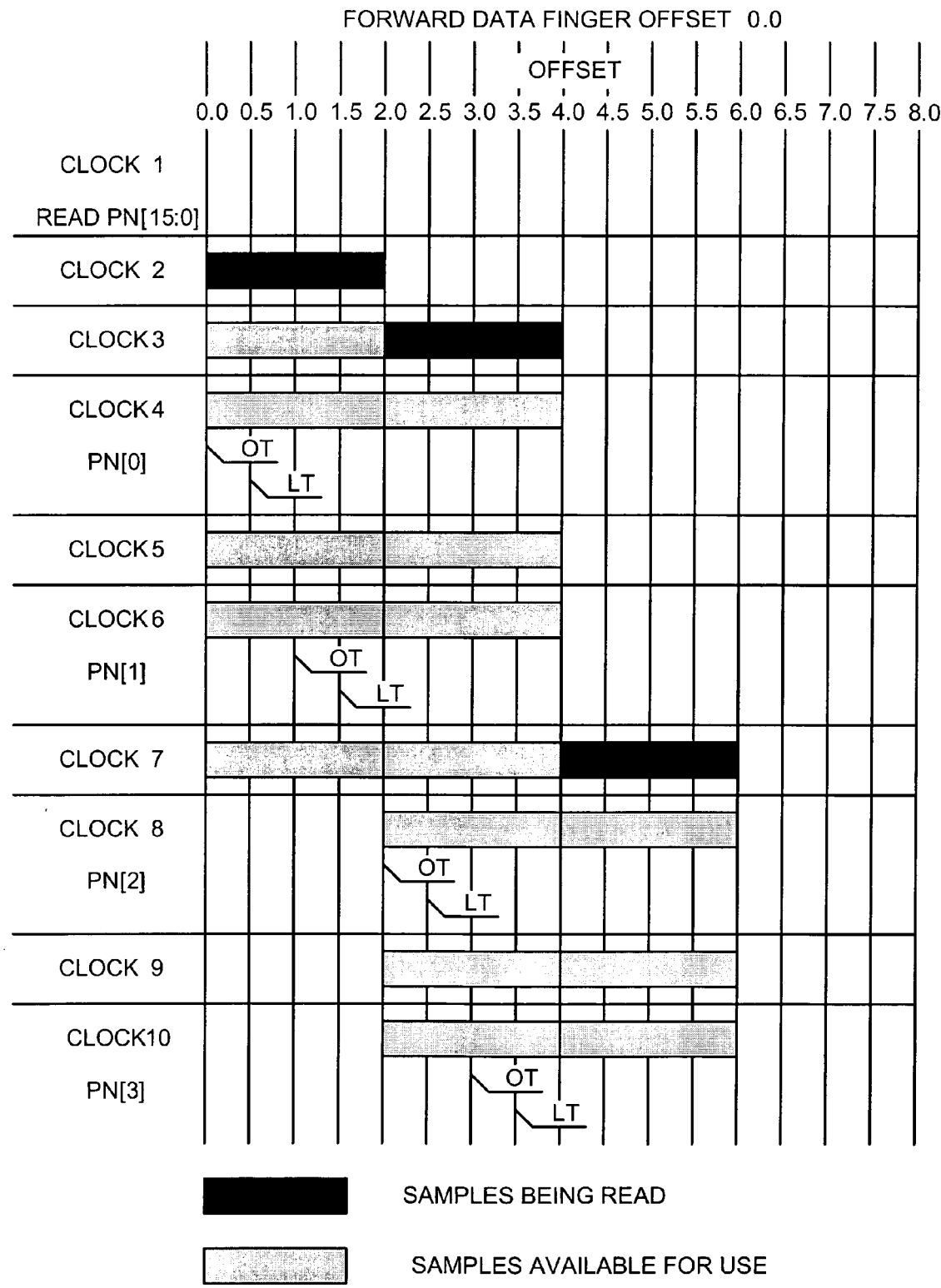
FIGS. 11A and 11B are timing diagrams for the processing of data samples by the data processor for time offsets of zero and 1.5, respectively.

FIG. 11A is a timing diagram for the processing of data samples by data processor 230 for a time offset of zero. In this example, two data samples are available for each chip period and each data sample has four bits of resolution. For each 32-bit read operation, either 16 complex IPN and QPN samples for an 8-chip period or four complex data samples for a 2-chip period can be retrieved from buffer 224.

In the first clock cycle, the complex PN samples for eight chips are retrieved from buffer 224 and provided to latch 732 within correlator 522 (see FIG. 7A). In the second clock cycle, the data samples for the first two chips corresponding to time offsets of 0.0, 0.5, 1.0, and 1.5 are retrieved from buffer 224 and latched by latches 712a, 712b, 712c, and 712d, respectively. In the third clock cycles, the samples in latches 712 are re-latched by latches 714, and the data samples for the next two chips corresponding to time offsets of 2.0, 2.5, 3.0, and 3.5 are retrieved from buffer 224 and latched by latches 712a, 712b, 712c, and 712d, respectively. In the fourth clock cycle, the data samples for the first chip corresponding to time offsets of 0.0 and 0.5 are correlated by multipliers 720a and 720b, respectively, within correlator 522. In the fifth clock cycle, correlator 522 is idle. In the sixth clock cycle, the data samples for the second chip corresponding to time offsets of 1.0 and 1.5 are correlated by multipliers 720c and 720d, respectively. The processing performed for clock cycles seven through ten is similar to the processing performed for clock cycles three through six. The data processing further continues in similar manner until the next set of PN samples are needed and retrieved.

Figure 11B:
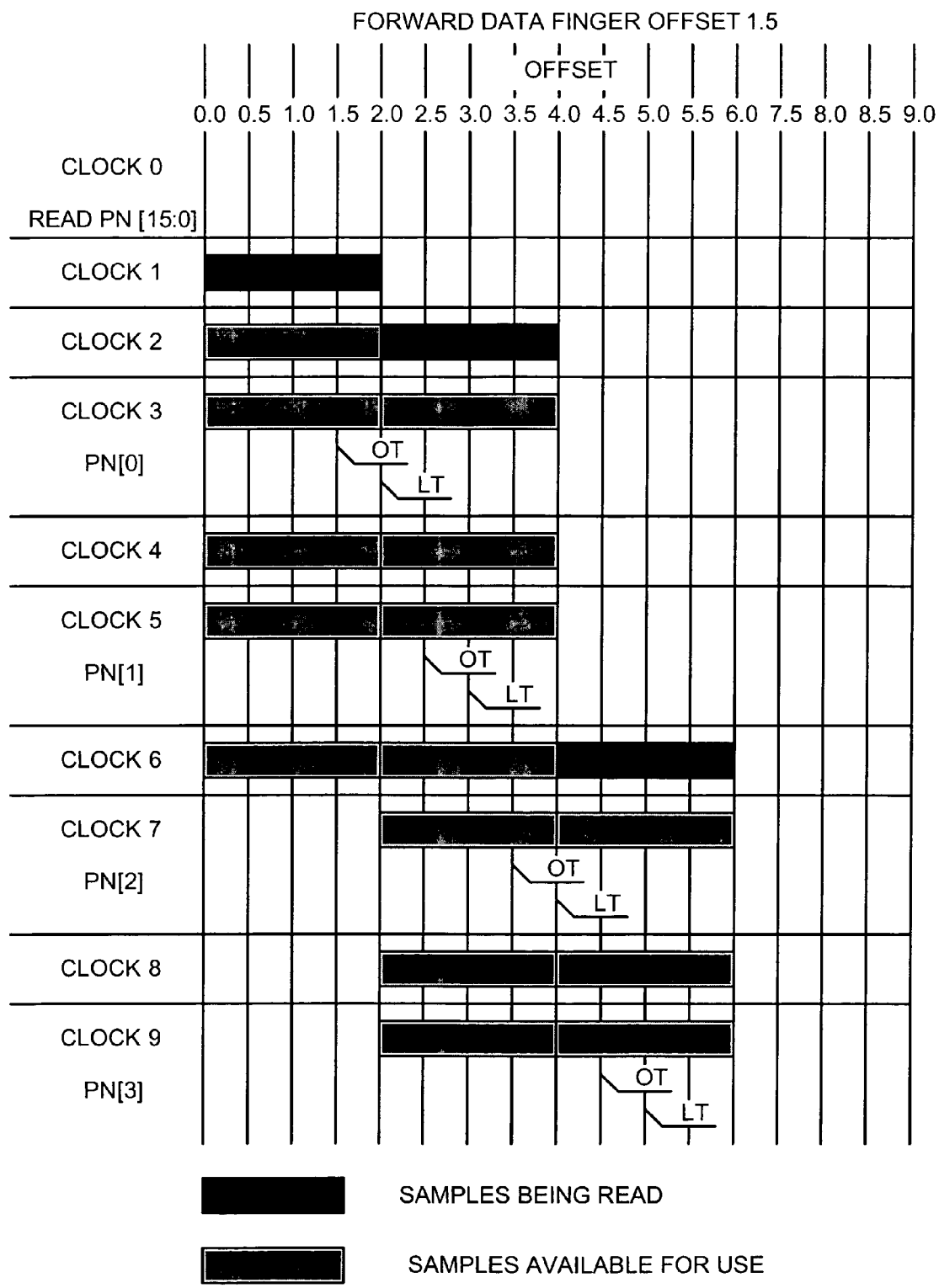

FIG. 11B is a timing diagram for the processing of data samples by data processor 230 for a time offset of 1.5. In an embodiment, data samples are retrieved from buffer 224 starting at even chip indices (e.g., 0, 2, 4, and so on). Thus, the time offset for a particular multipath can be broken down into an integer portion and a fractional portion. The integer portion identifies the particular even chip index from which to retrieve the data samples. The fractional portion identifies the particular half chip offset in the retrieved data samples.

As shown in FIG. 11B, the PN samples and data samples are retrieved from buffer 224 in similar manner as for the time offset of zero. However, in the third clock cycle, the data processing is performed on the data samples corresponding to the time offset of 1.5. Specifically, the data samples for the time offsets of 1.5 and 2.0 are correlated by multipliers 720d and 720a, respectively. Similarly, in the fifth clock cycle, the data samples for the time offsets of 2.5 and 3.0 are correlated by multipliers 720b and 720c, respectively. The data processing then continues in similar manner.

The receiver unit described above can be advantageously used in a user terminal or a base station of a communications system. The signal processing for the forward and reverse links may be different and is typically dependent on the particular CDMA standard or system being implemented. Also, the requirements for the user terminal may be different from those for the base station. For example, the user terminal is typically required to process a single transmission from one base station or redundant transmissions from multiple base stations, whereas a base station is typically required to concurrently process multiple (and different) transmissions from multiple user terminals. Thus, the receiver unit is typically designed especially for the particular application for which it is used.

The elements described above for receiver unit 200 (e.g., address generator 220, input data interface 222, buffer 224, data processor 230, micro-controller 232, controller 240, and so on) can be implemented within one or more application specific integrated circuits (ASICs), digital signal processors, controllers, micro-controllers, microprocessors, other electronic units designed to perform the functions described herein, or a combination thereof. Buffer 224 and buffer/de-interleaver 234 can be implemented within one or more random access memories (RAMs), dynamic RAMs (DRAMs), FLASH memories, or devices of other memory technologies. Also, buffer 224 and buffer/de-interleaver 234 may also be implemented within the same integrated circuit used to implement other elements of receiver unit 200.

For clarity, many aspects and embodiments of the invention have been described specifically in the context of the forward link data transmission in the HDR CDMA system. However, the invention may also be used for the reverse link data transmission and for other communications systems (e.g., the IS-95 CDMA system, the W-CDMA system, and so on).

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A receiver unit, comprising:
   a first buffer operative to receive and store digitized samples comprising multiple instances of a received signal;
   a data processor coupled to the first buffer and operative to (a) retrieve different segments of the digitized samples one segment at a time from the first buffer, each of the retrieved different segments comprising one of the multiple signal instances, (b) process two or more of the retrieved different segments one segment at a time with one programmed despreading sequence to provide despread samples, (c) decover the despread samples with a channelization code of programmable length to provide decovered symbols, (d) demodulate the decovered symbols to provide demodulated symbols, and (e) combine the demodulated symbols from the multiple signal instances to provide processed symbols;

a controller being operative to direct the data processor;

a microcontroller coupled to the data processor and the controller, the microcontroller being operative to receive tasks from the controller, instantiate a state machine for each task, and direct the data processor to process the retrieved different segments; and an address generator coupled to the first buffer and the controller, the address generator being operative to implement a counter to control a write address for writing digitized samples to the first buffer, the counter being operative to send a signal to the controller to initiate processing of the stored samples by the data processor.

2. The receiver unit of claim 1, wherein the controller is operative to dispatch tasks for the data processor and to process signaling data from the data processor.

3. The receiver unit of claim 1, wherein the micro-controller is operative to receive the tasks and generate a set of control signals to direct the operation of the first buffer and the data processor to execute the dispatched tasks.

4. The receiver unit of claim 1, wherein the clock a frequency of the data processor is at least ten times higher than the sample rate.

5. The receiver unit of claim 1, wherein the receiver unit is configured for operation in a high data rate (HDR) CDMA system.

6. The receiver unit of claim 1, wherein the controller has a time tracking loop operative to track movement of one of the multiple signal instances being processed by the data processor, and further being configured to generate a time offset used to retrieve a segment of the digitized samples in the first buffer containing said one of the multiple signal instances in response to the time tracking loop.

7. The receiver unit of claim 1 wherein the data processor is further configured to coherently combine the correlated samples from said two or more of the segments to generate processed symbols.

8. A receiver unit, comprising:

a first buffer operative to receive and store digitized samples at a particular sample rate; and a data processor coupled to the first buffer and operative to retrieve segments of the digitized samples from the first buffer and to process the retrieved segments with a particular set of parameter values, wherein the data processor is operated based on a processing clock having a frequency that is higher than the sample rate, and wherein the data processor includes a correlator operative to despread the retrieved segments of the digitized samples with corresponding segments of PN (pseudo-random noise) despreading sequences to provide correlated samples, the correlator including an interpolator operative to receive and interpolate the despread samples to generate interpolated samples that are provided as the correlated samples, and wherein the interpolator includes one or more pairs of scaling elements, each of the scaling elements operative to receive and scale respective despread samples with a particular gain to generate scaled samples, and one or more summer, each of the summers coupled to a respective pair of scaling elements and operative to receive and sum the scaled samples from the pair of scaling elements to generate the interpolated samples.

9. A receiver unit, in a wireless communications system, comprising:

a first buffer operative to receive and store digitized samples at a particular sample rate;

a data processor coupled to the first buffer and operative to retrieve segments of the digitized samples from the first buffer and to process each of the retrieved segments with a particular set of parameter values, wherein the data processor is operated based on a processing clock having a frequency that is higher than the sample rate;

a controller coupled to the data processor and operative to dispatch tasks for the data processor and to process signaling data from the data processor; and a micro-controller coupled to the controller and operative to receive the dispatched tasks and to generate a set of control signals to direct the operation of the first buffer and the data processor to execute the dispatched tasks, wherein the micro-controller includes a set of latches operative to latch a dispatched task and one or more parameter values to be applied for the dispatched task, at least one counter, each of the counters coupled to a respective latch and operative to provide an indicator signal based on a value stored in the latch, and a sequencing controller operative to receive at least one indicator signal and the dispatched task and to generate the set of control signals.

10. The receiver unit of claim 9, wherein the controller is operative to perform pilot processing and time tracking for each of the signal instances being processed.

11. The receiver unit of claim 9, wherein the controller is operative to perform lock detection for each of the signal instances being processed.

12. The receiver unit of claim 9, wherein the controller is operative to perform frequency tracking of the digitized samples.

13. The receiver unit of claim 9, further comprising:

a receiver operative to receive the multiple instances of the signal to provide the digitized samples.

14. The receiver unit of claim 9, wherein the data processor includes a correlator operative to despread the retrieved segments of digitized samples with corresponding segments of PN (pseudo-random noise) despreading sequences to provide correlated samples.

15. The receiver unit of claim 14, wherein the data processor further includes a symbol demodulator and combiner coupled to the correlator and operative to receive and process the correlated samples to provide processed symbols.

16. The receiver unit of claim 15, wherein the symbol demodulator and combiner includes a decover element operative to receive and decover the correlated samples with one or more channelization codes to provide decovered symbols.

17. The receiver unit of claim 16, wherein the channelization codes are Walsh codes each having a length that is programmable and defined by one of the sets of the parameter values.

18. The receiver unit of claim 16, wherein the decover element is implemented with a fast Hadamard transform (FHT) element having L stages.

19. The receiver unit of claim 18, wherein the FHT element is operative to receive and process inphase and quadrature correlated samples on alternating clock cycles.

20. The receiver unit of claim 18, wherein the FHT element is operative to perform decovering with one or more Walsh symbols of a length of 1, 2, 4, 8, 16, 32, 64, or 128.

21. The receiver unit of claim 16, wherein the symbol demodulation and combiner further includes
a pilot demodulator coupled to the decover element and operative to demodulate the decovered symbols with pilot symbols to provide demodulated symbols.

22. The receiver unit of claim 21, wherein the symbol demodulator and combiner further includes
a symbol accumulator coupled to the pilot demodulator and operative to accumulate the demodulated symbols from multiple signal instances to provide the processed symbols.

23. The receiver unit of claim 14, wherein the data processor further includes
an accumulator coupled to the correlator and operative to receive and process the correlated samples to provide accumulated results.

24. The receiver unit of claim 23, wherein the accumulator includes
a plurality of accumulate elements, each accumulate element operative to provide pilot signal estimate for said different time offsets a particular time offset.

25. The receiver unit of claim 23, wherein the accumulator is operative to accumulate the correlated samples over a programmable time interval to provide pilot signal estimates.

26. The receiver unit of claim 15, wherein the data processor further includes
a second buffer coupled to the symbol demodulation and combiner and operative to store the processed symbols.

27. The receiver unit of claim 26, wherein the second buffer is operative to provide the processed symbols to a subsequent signal processing element in an output order that is different from an input order to provide de-interleaving of the processed symbols.

28. The receiver unit of claim 27, wherein the second buffer includes at least two sections, one section operative to store processed symbols for a current packet being processed and another section operative to store processed symbols for a prior processed packet to be provided to the subsequent signal processing element.

29. The receiver unit of claim 14, wherein the correlator includes
a set of K multipliers operative to concurrently despread sets of up to K complex digitized samples.

30. The receiver unit of claim 29, wherein the correlator further includes
a set of K summers coupled to the set of K multipliers, each summer operative to receive and sum pairs of samples from two of the multipliers.

31. The receiver unit of claim 14, wherein the correlator includes
an interpolator operative to receive and interpolate the despread samples to generate interpolated samples that are provided as the correlated samples.

32. The receiver unit of claim 9, wherein the controller is operative to instantiate a timing state machine for each signal instance being processed.

33. The receiver unit of claim 32, wherein each instantiated timing state machine includes
a time tracking loop operative to track movement of the signal instance being processed.

34. The receiver unit of claim 9, wherein the controller is operative to receive a timing signal and initiate processing of the segments of digitized samples in response to the received timing signal.

35. The receiver unit of claim 34, wherein the timing signal is generated based on a comparison value provided by the controller.

36. The receiver unit of claim 34, wherein the timing signal is indicative of a particular number of digitized samples having been stored to the first buffer.

37. The receiver unit of claim 9, wherein a word of 32 bits or more is written to the first buffer or read from the first buffer for each buffer access.

38. The receiver unit of claim 9, wherein the first buffer is operative to store two or more packets of digitized samples.

39. The receiver unit of claim 9, wherein the first buffer is further operative to store pseudo-random noise (PN) samples.

40. The receiver unit of claim 9, wherein the processing clock has a frequency that is at least ten times higher than the sample rate, the sample rate being asynchronous with the processing clock.

41. The receiver unit of claim 9, further comprising:
a data interface coupled to the first buffer, the data interface operative to receive the digitized samples, discard unnecessary samples, and assemble the samples into words suitable for efficient storage to the first buffer.

42. The receiver unit of claim 9, wherein the microcontroller is operative to instantiate a task state machine for each task being processed.

43. The receiver unit of claim 9, wherein at least one of the parameter values is programmable.

44. A method for processing a received signal in a wireless communications system, the method comprising:
buffering digitized samples of a received signal in a first buffer;
retrieving segments of the digitized samples from the first buffer,
processing each of the retrieved segments with a particular set of parameter values;
dispatching tasks for a data processor to process the retrieved segments and to process signaling data from the data processor;
receiving the dispatched tasks and generating a set of control signals to direct the operation of the first buffer and the data processor to execute the dispatched tasks;
latching a dispatched task and one or more parameter values to be applied for the dispatched task;
providing an indicator signal based on a value stored in the latch; and
receiving at least one indicator signal and the dispatched task and to generate the set of control signals.

45. The method of claim 44, wherein the processing of the segments includes despreading the retrieved segments of digitized samples with corresponding segments of PN (pseudo-random noise) despreading sequences to provide correlated samples.

46. The method of claim 45, wherein the processing further includes
decovering the correlated samples with one or more channelization codes to provide decovered symbols.

47. The method of claim 46, wherein the processing further includes
demodulating the decovered symbols with pilot symbols to provide demodulated symbols.

48. The method of claim 47, wherein the processing further includes
accumulating the demodulated symbols from multiple signal instances to provide processed symbols.

49. The method of claim 44, wherein the digital samples are received, processed and digitized at a sample rate, and wherein the retrieved segments are processed by the data processor with a processing clock having a frequency that is higher than the sample rate, the sample rate being asynchronous with the processing clock, the method further comprising:
  tracking a chip rate of the digitized samples; and
  providing a signal used to write digitized samples to the first buffer starting at designated locations.

50. The method of claim 44 wherein the processing of the signal instances comprises:
  despreading the retrieved segments of the digitized samples with corresponding segments of PN (pseudo-random noise) despreading sequences to provide correlated samples
  decovering the correlated samples with one or more channelization codes to provide decovered symbols;
  demodulating the decovered symbols with pilot symbols to provide demodulated symbols; and
  accumulating the demodulated symbols from the multiple signal instances to provide processed symbols.

51. A method comprising:
  storing digitized samples comprising multiple instances of a received signal at a first buffer;
  at a data processor, retrieving different segments of the digitized samples one segment at a time from the first buffer, each of the retrieved different segments comprising one of the multiple signal instances;
  processing two or more of the retrieved different segments one segment at a time with one programmed despreading sequence to provide despread samples;
  decovering the despread samples with a channelization code of programmable length to provide decovered symbols;
  demodulating the decovered symbols to provide demodulated symbols;
  combining the demodulated symbols from the multiple signal instances to provide processed symbols;
  receiving tasks, instantiating a state machine for each task, and directing the data processor to process the retrieved multiple segments;
  implementing a counter to control a write address for writing digitized samples to the first buffer; and
  sending a signal to a controller to initiate processing of the stored samples by the data processor.

* * * * *